US012676412B2

(12) United States Patent
Morimoto et al.

(10) Patent No.: US 12,676,412 B2
(45) Date of Patent: Jul. 7, 2026

(54) ANTENNA MODULE AND COMMUNICATION DEVICE MOUNTED WITH THE SAME

(71) Applicant: Murata Manufacturing Co., Ltd., Nagaokakyo (JP)

(72) Inventors: Hideyuki Morimoto, Nagaokakyo (JP); Kengo Onaka, Nagaokakyo (JP); Masato Iemura, Nagaokakyo (JP); Izumi Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 63 days.

(21) Appl. No.: 18/939,542

(22) Filed: Nov. 7, 2024

(65) Prior Publication Data

US 2025/0070462 A1 Feb. 27, 2025

Related U.S. Application Data

(63) Continuation of application No. PCT/JP2023/008827, filed on Mar. 8, 2023.

(30) Foreign Application Priority Data

Jun. 23, 2022 (JP) ................................ 2022-101195

(51) Int. Cl.
*H01Q 3/36* (2006.01)
*H01Q 9/04* (2006.01)
(Continued)

(52) U.S. Cl.
CPC ............ *H01Q 3/36* (2013.01); *H01Q 9/0414* (2013.01); *H01Q 21/24* (2013.01)

(58) Field of Classification Search
CPC .......... H01Q 1/24; H01Q 1/243; H01Q 21/00; H01Q 21/0006; H01Q 21/06;
(Continued)

(56) References Cited

U.S. PATENT DOCUMENTS 5,686,926 A 11/1997 Kijima et al.
8,228,232 B2 * 7/2012 Corman .............. H01Q 15/242 342/362

(Continued)

FOREIGN PATENT DOCUMENTS

JP H06-196927 A 7/1994
JP H11-298239 A 10/1999

(Continued)

OTHER PUBLICATIONS

International Search Report and Written Opinion mailed on May 16, 2023, received for International Application No. PCT/JP2023/008827, filed on Mar. 8, 2023, 10 pages including English Translation.

*Primary Examiner* — Tho G Phan
(74) *Attorney, Agent, or Firm* — XSENSUS LLP

(57) ABSTRACT

An antenna module includes antenna groups, hybrid couplers, dividers, and an RFIC. The antenna group includes radiating elements. The antenna group includes radiating elements. Each hybrid coupler has input terminals and output terminals. The RFIC supplies a high frequency signal to each radiating element. Each divider splits the high frequency signal from the RFIC in two directions. The divider splits a first signal from the RFIC to the input terminal of each hybrid coupler. The divider splits a second signal from the RFIC to the input terminal of each hybrid coupler. The output terminals of the hybrid coupler are respectively connected to the radiating elements. The output terminals of the hybrid coupler are respectively connected to the radiating elements. In each hybrid coupler, a phase difference between the high frequency signals supplied to the input terminals is set to 90°.

20 Claims, 25 Drawing Sheets

(51) Int. Cl.
*H01Q 21/00* (2006.01)
*H01Q 21/06* (2006.01)
*H01Q 21/24* (2006.01)

(58) Field of Classification Search
CPC ...... H01Q 21/065; H01Q 21/08; H01Q 21/24; H01Q 21/28; H01Q 3/36; H01Q 9/04; H01Q 9/0407; H01Q 9/0414
See application file for complete search history.

(56) References Cited

U.S. PATENT DOCUMENTS

| | | | | |
|---|---|---|---|---|
| 10,033,111 | B2 * | 7/2018 | Timofeev | H01Q 21/0075 |
| 10,840,607 | B2 * | 11/2020 | Mei | H01Q 21/0006 |
| 10,879,605 | B2 * | 12/2020 | Varnoosfaderani | H01Q 21/26 |
| 11,128,041 | B2 * | 9/2021 | Luna | H04B 7/0617 |
| 11,228,119 | B2 * | 1/2022 | Schwartz | H01Q 21/22 |

FOREIGN PATENT DOCUMENTS

| | | | |
|---|---|---|---|
| JP | 2013-531434 | A | 8/2013 |
| WO | 2017/085871 | A1 | 5/2017 |
| WO | 2020/170722 | A1 | 8/2020 |
| WO | 2022/224650 | A1 | 10/2022 |

* cited by examiner (28 GHz BAND)

| | | COMPARATIVE EXAMPLE (4 ELEMENTS) | EMBODIMENT 1 (4 + 1 ELEMENTS) | MODIFICATION EXAMPLE (4 + 1 ELEMENTS) |
|---|---|---|---|---|
| GAIN DISTRIBUTION | |  |  |  |
| CDF [dBi] | 100% | 10.16 | 10.25 | 10.27 |
| | 80% | 6.48 | 6.10 | 6.12 |
| | 50% | 1.90 | 1.62 | 1.64 |
| | 20% | −0.32 | −1.80 | −1.85 |

(39 GHz BAND)

| | | COMPARATIVE EXAMPLE (4 ELEMENTS) | EMBODIMENT 1 (4 + 1 ELEMENTS) | MODIFICATION EXAMPLE (4 + 1 ELEMENTS) |
|---|---|---|---|---|
| GAIN DISTRIBUTION | |  |  |  |
| CDF [dBi] | 100% | 10.39 | 11.57 | 11.57 |
| | 80% | 6.24 | 5.70 | 5.71 |
| | 50% | 0.46 | 0.77 | 0.80 |
| | 20% | −2.50 | −2.43 | −2.41 |

(28 GHz BAND)

| | | EMBODIMENT 1 (4 + 1 ELEMENTS: IN-PHASE) | EMBODIMENT 6 (4 + 1 ELEMENTS: 120°) |
|---|---|---|---|
| GAIN DISTRIBUTION | |   |   |
| CDF [dBi] | 100% | 10.25 | 9.97 |
| | 80% | 6.10 | 5.75 |
| | 50% | 1.62 | 2.34 |
| | 20% | −1.80 | −1.09 |

(39 GHz BAND)

| | | EMBODIMENT 1 (4 + 1 ELEMENTS: IN-PHASE) | EMBODIMENT 6 (4 + 1 ELEMENTS: 120°) |
|---|---|---|---|
| GAIN DISTRIBUTION | |  |  |
| CDF [dBi] | 100% | 11.57 | 10.76 |
| | 80% | 5.70 | 6.05 |
| | 50% | 0.77 | 1.75 |
| | 20% | −2.43 | −1.97 |

ANTENNA MODULE AND COMMUNICATION DEVICE MOUNTED WITH THE SAME

CROSS-REFERENCE TO RELATED APPLICATIONS

This disclosure is a continuation of International Patent Application No. PCT/JP2023/008827, filed 8 Mar. 2023, which contains subject matter related to that disclosed in Japanese Priority document JP2022-101195, filed 23 Jun. 2022, and the entire contents of each of which are incorporated herein by reference.

TECHNICAL FIELD

The present disclosure relates to an antenna module and a communication device mounted with the same, and more specifically, to a technology for improving antenna characteristics of an array antenna.

BACKGROUND ART

International Publication No. 2020/170722 (Patent Document 1) discloses an antenna module in which radiating elements are disposed on two surfaces having different normal directions in a dielectric substrate which has a flat plate shape bent into a substantially L-shape. In the antenna module disclosed in International Publication No. 2020/170722 (Patent Document 1), the radiating elements on the respective surfaces of the dielectric substrate can radiate radio waves in different directions.

CITATION LIST

Patent Document

Patent Document 1: International Publication No. 2020/170722

SUMMARY

Technical Problems

In a configuration of the antenna module disclosed in International Publication No. 2020/170722 (Patent Document 1), high frequency signals are individually supplied from corresponding output ports in a power feeding circuit (RFIC) to the respective radiating elements on the substrate. In such a configuration, in a case where the number of radiating elements disposed on the substrate is increased, the RFIC requires a number of output ports corresponding to the radiating elements to be disposed.

In the antenna module as described above, generally, a high antenna gain and/or a wide radiation range is required. In order to meet this requirement, a method of increasing the radiating elements in each substrate is considered. In this case, the RFIC may require more output ports. In particular, in a case of a multi-band compatible antenna that radiates radio waves in a plurality of frequency bands and/or in the case of a dual-polarization type antenna that radiates radio waves in two different polarization directions, the number of required output ports is further increased.

On the other hand, in the RFIC, due to the limitations on the element size of the RFIC caused by limitations on a mountable region in the antenna module or the like, and/or suppression of the increase in the cost of the RFIC, there is a case in which the number of required output ports cannot be sufficiently secured. In such a case, a state in which the desired antenna characteristics cannot be realized may occur.

The present disclosure has been made to solve such a problem, and an object of the present disclosure is to improve the antenna characteristics in the antenna module in which the number of output ports of the RFIC is smaller than the number of radiating elements.

Solutions to Problems

According to an aspect of the present disclosure, there is provided an antenna module including a first antenna group including a first radiating element and a second radiating element;

- a second antenna group including a third radiating element and a fourth radiating element;
- a first hybrid coupler and a second hybrid coupler each having a first input terminal, a second input terminal, a first output terminal, and a second output terminal;
- a power feeding circuit having a first port and a second port;
- a first divider configured to split a first signal from the first port of the power feeding circuit to the first input terminal of each of the first hybrid coupler and the second hybrid coupler; and
- a second divider configured to split a second signal from the power feeding circuit to the second input terminal of each of the first hybrid coupler and the second hybrid coupler, the second signal being substantially 90 degrees out of phase with the first signal; wherein
- the first output terminal and the second output terminal of the first hybrid coupler are connected to the first radiating element and the third radiating element, respectively,
- the first output terminal and the second output terminal of the second hybrid coupler are connected to the second radiating element and the fourth radiating element, respectively, and
- a total number of antennas in the first antenna group and the second antenna group being greater than a total number of ports of the power feeding circuit that provide signals to drive the total number of antennas.

According to another aspect of the present disclosure, there is provided an antenna module including a plurality of radiating elements including a first radiating element and a second radiating element and being capable of radiating a radio wave in a first direction as a polarization direction and a radio wave in a second direction as the polarization direction;

- a first hybrid coupler and a second hybrid coupler each having a first input terminal, a second input terminal, a first output terminal, and a second output terminal;
- a power feeding circuit configured to supply a radio frequency signal to the plurality of radiating elements; and
- a first divider and a second divider each configured to split the radio frequency signal from the power feeding circuit in two directions, wherein
- the first divider is configured to split a first signal from the power feeding circuit to the first input terminal of each hybrid coupler,
- the second divider is configured to split a second signal from the power feeding circuit to the second input terminal of each hybrid coupler, the first output terminal of the first hybrid coupler is connected to a power supply point to establish polarization in the first direction of the first radiating element, the second output terminal of the first hybrid coupler is connected to a power supply point to establish polarization in the second direction of the second radiating element, the first output terminal of the second hybrid coupler is connected to a power supply point to establish polarization in the first direction of the second radiating element, the second output terminal of the second hybrid coupler is connected to a power supply point to establish polarization in the second direction of the first radiating element, and in each of the first hybrid coupler and the second hybrid coupler, a phase difference between radio frequency signals supplied to the first input terminal and the second input terminal is set to 90°.

Advantageous Effects of Disclosure

In the antenna module according to the present disclosure, the high frequency signals from the output ports assigned to the radiating elements included in the second antenna group can be supplied to the radiating elements included in the first antenna group by using the hybrid couplers and the dividers (dividers). As a result, in the antenna module in which the number of output ports of the power feeding circuit (RFIC) is smaller than the number of radiating elements, the antenna characteristics can be improved.

DESCRIPTION OF EMBODIMENTS

Figure 1:
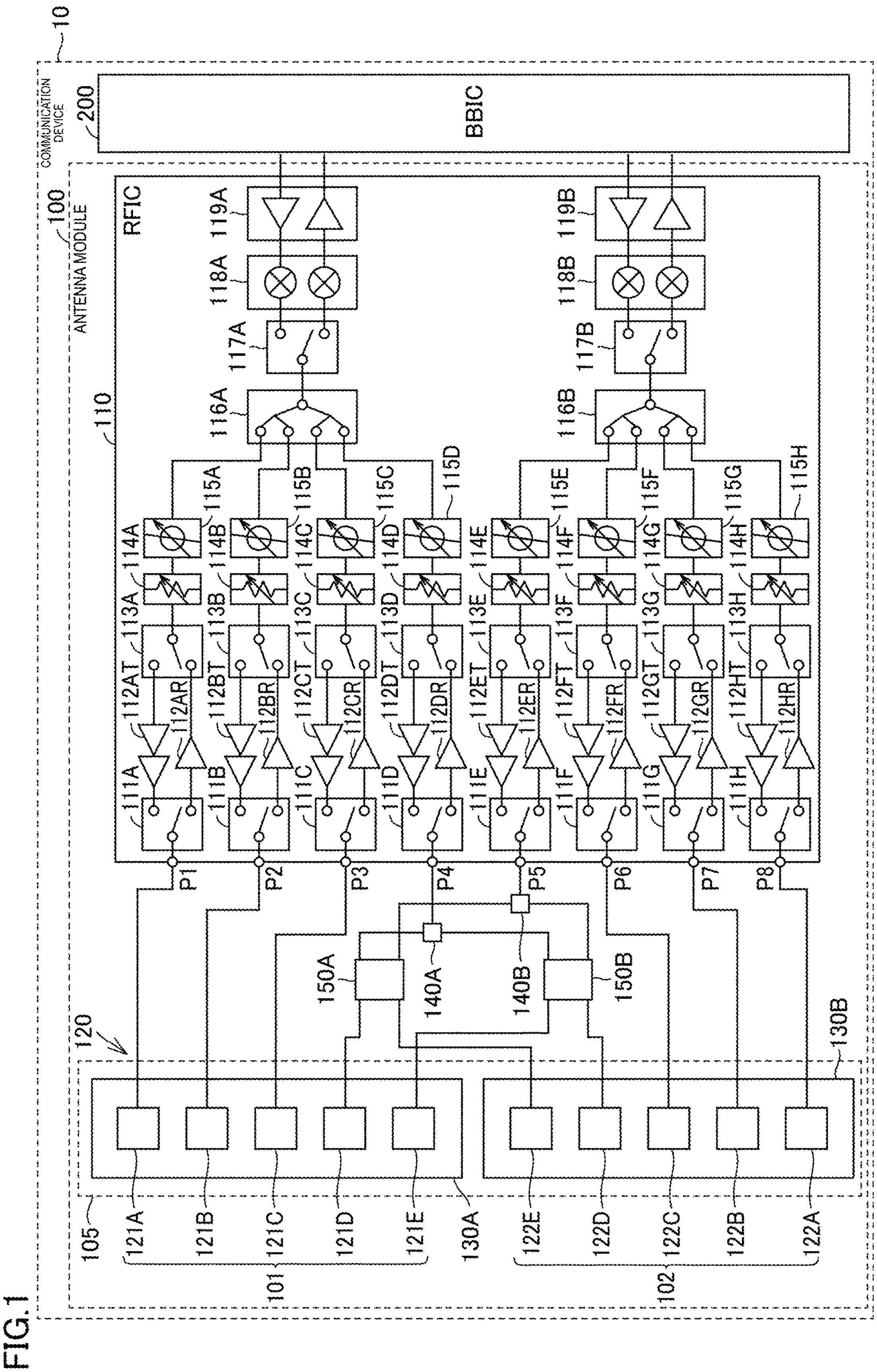
FIG. 1 is a block diagram of a communication device to which an antenna module according to Embodiment 1 is applied.

Hereinafter, embodiments of the present disclosure will be described in detail with reference to the accompanying drawings. The same or corresponding portions in the drawings are denoted by the same reference numerals, and the description is not repeated.

First Embodiment (Basic Configuration of Communication Device)

FIG. 1 is a block diagram of a communication device 10 to which an antenna module 100 according to the present embodiment is applied. The communication device 10 is, for example, a mobile terminal such as a mobile phone, a smartphone, or a tablet, a personal computer having a communication function, or the like. An example of a frequency band of radio waves used in the antenna module 100 according to the present embodiment is, for example, a radio wave in a millimeter wave band having a center frequency of 28 GHZ, 39 GHz, 60 GHz, or the like, but radio waves in frequency bands other than the above-mentioned can be applied.

Figure 3:
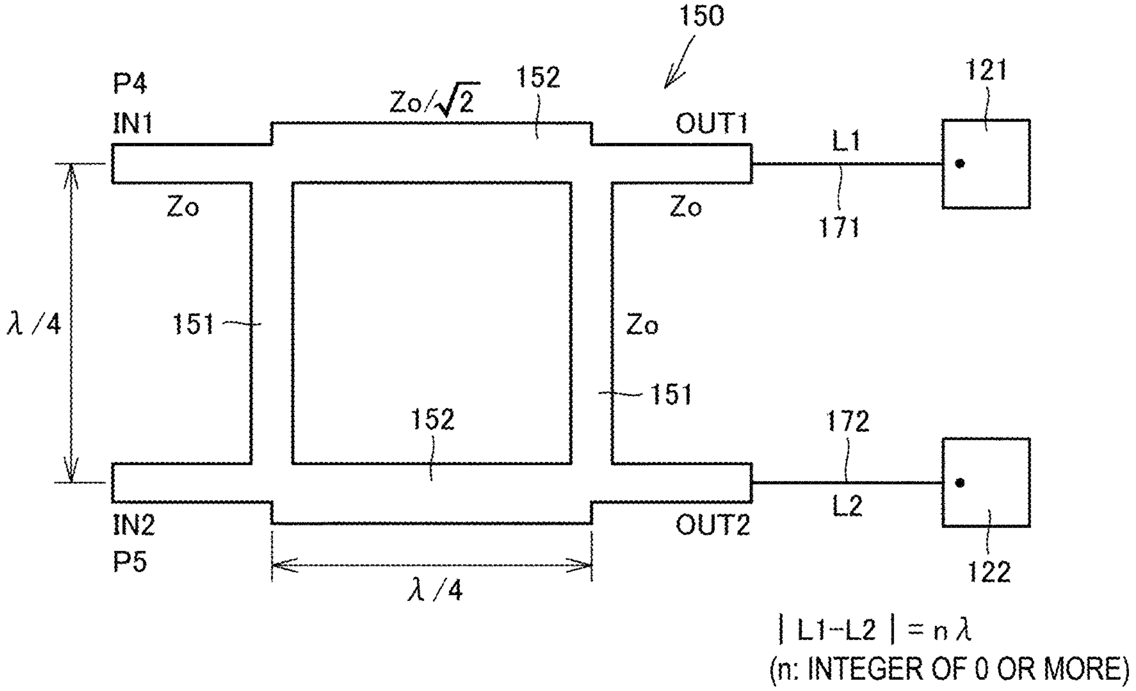
FIG. 3 is a diagram for explaining a hybrid coupler.

Referring to FIG. 1, the communication device 10 includes the antenna module 100 and a BBIC 200 that configures a baseband signal processing circuit. The antenna module 100 includes an RFIC 110, which is an example of a power feeding circuit, an antenna device 120, dividers 140A and 140B, and hybrid couplers 150A and 150B. In the following description, the dividers (dividers) 140A and 140B may be collectively referred to as a "divider 140", and the hybrid couplers 150A and 150B may be collectively referred to as a "hybrid coupler 150". A hybrid coupler, as will be discussed more with respect to FIG. 3, is a passive device that evenly splits (or combines) power of a signal into two signals with constant phase difference (usually 90 degree or 180 degree phase difference).

The communication device 10 up-converts a signal transmitted from the BBIC 200 to the antenna module 100 to a high frequency signal and radiates the signal from the antenna device 120, and down-converts a high frequency signal received at the antenna device 120 and processes the signal at the BBIC 200.

The antenna device 120 includes a dielectric substrate 105 having two substrates 130A and 130B. A plurality of radiating elements are disposed on each substrate of the dielectric substrate 105. More specifically, FIG. 1 shows a configuration in which five radiating elements 121A to 121E (first antenna group 101) are disposed on the substrate 130A and five radiating elements 122A to 122E (second antenna group 102) are disposed on the substrate 130B as an example, but the number of radiating elements disposed on each substrate is not limited thereto. In addition, in FIG. 1, an example in which the radiating elements are disposed in a one-dimensional array in a row in each substrate of the dielectric substrate is illustrated, but the radiating elements may be disposed in a two-dimensional array in each substrate.

In the following description, the radiating elements 121A to 121E included in the first antenna group 101 may be collectively referred to as a "radiating element 121", and the radiating elements 122A to 122E included in the second antenna group 102 may be collectively referred to as a "radiating element 122". In Embodiment 1, the radiating elements 121 and 122 are microstrip antennas having a substantially square planar shape. The shapes of the radiating elements 121 and 122 may be circular, elliptical, or other polygons.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiner/dividers 116A and 116B, mixers 118A and 118B, and amplifier circuits 119A and 119B. Here, the configuration of the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/divider 116A, the mixer 118A, and the amplifier circuit 119A is a circuit for a high frequency signal radiated from the radiating element 121A of the substrate 130A. In addition, the configuration of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/divider 116B, the mixer 118B, and the amplifier circuit 119B is a circuit for a high frequency signal radiated from the radiating element 122 of the substrate 130B.

In a case where the high frequency signal is transmitted, the switches 111A to 111H and 113A to 113H are switched to the power amplifier 112AT to 112HT side, and the switches 117A and 117B are connected to the transmission side amplifiers of the amplifier circuits 119A and 119B. In a case where the high frequency signal is received, the switches 111A to 111H and 113A to 113H are switched to the low noise amplifier 112AR to 112HR side, and the switches 117A and 117B are connected to the receiving side amplifiers of the amplifier circuits 119A and 119B.

The signal transmitted from the BBIC 200 is amplified by the amplifier circuits 119A and 119B and up-converted by the mixers 118A and 118B. The transmission signal, which is the up-converted high frequency signal, is divided into four by the signal combiner/dividers 116A and 116B and is supplied to the radiating element through the corresponding signal path. By individually adjusting the phase shift degrees of the phase shifters 115A to 115H disposed in each signal path, the directivity of the radio wave output from the radiating element of each substrate can be adjusted. In addition, the attenuators 114A to 114H adjust the strength of the transmission signal.

The transmission signals from the output ports P1, P2, and P3 connected to the switches 111A, 111B, and 111C are supplied to the radiating elements 121A, 121B, and 121C, respectively. In addition, the transmission signals from the output ports P6, P7, and P8 connected to the switches 111F, 111G, and 111H are supplied to the radiating elements 122C, 122B, and 122A, respectively. The transmission signal from the output port P4 connected to the switch 111D is split in two directions by the divider 140A and is supplied to one input terminal of each of the hybrid coupler 150A and hybrid coupler 150B. In addition, the transmission signal from the output port P5 connected to the switch 111E is split in two directions by the divider 140B and is supplied to the other input terminal of each of the hybrid couplers 150A and 150B.

Two output terminals of the hybrid coupler 150A are connected to the radiating elements 121D and 122E, respectively. The two output terminals of the hybrid coupler 150B are connected to the radiating elements 121E and 122D, respectively.

The received signal, which is the high frequency signal received by each of the radiating elements 121 and 122, is transmitted to the RFIC 110, passes through four different signal paths, and is multiplexed in the signal combiner/dividers 116A and 116B. The multiplexed received signal is down-converted by the mixers 118A and 118B, amplified by the amplifier circuits 119A and 119B, and transmitted to the BBIC 200.

The RFIC 110 is formed as, for example, a one-chip integrated circuit component including the above-described circuit configuration. Alternatively, the device (switch, power amplifier, low noise amplifier, attenuator, and phase shifter) corresponding to each of the radiating elements 121A and 121B in the RFIC 110 may be formed as a one-chip integrated circuit component for each of the corresponding radiating elements.

(Configuration of Antenna Module)

Figure 2:
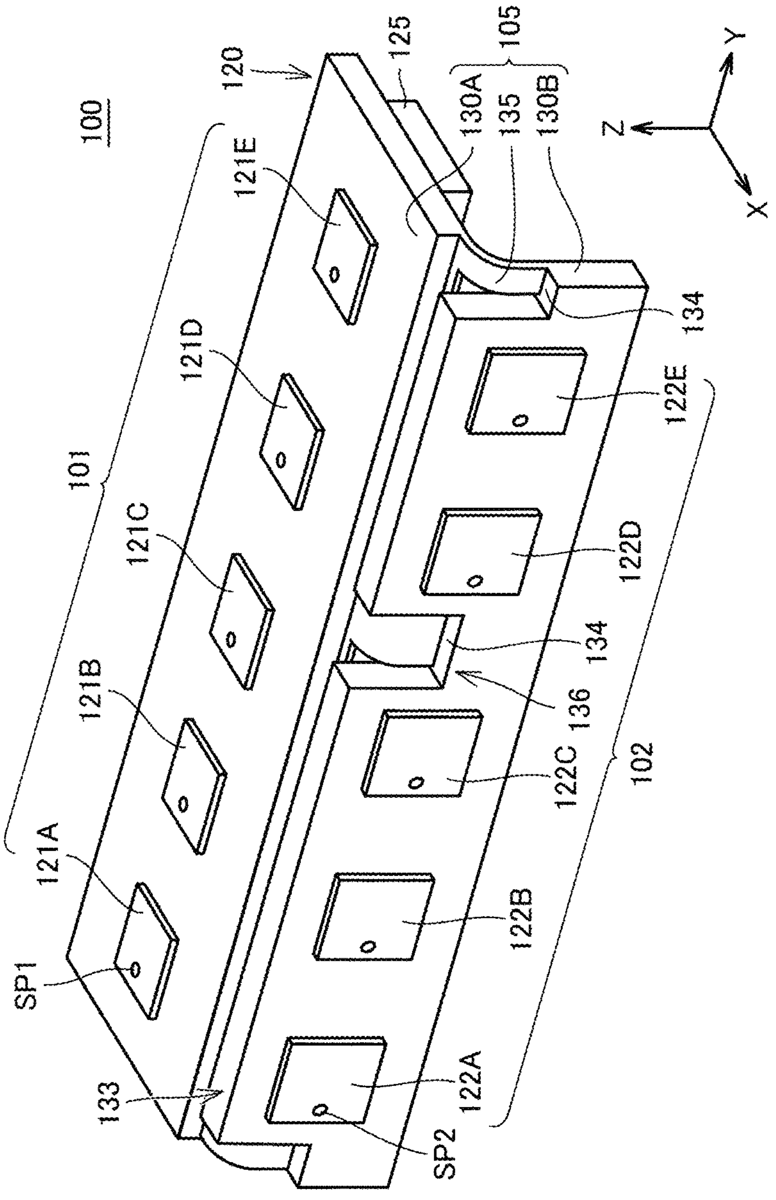
FIG. 2 is a perspective view of the antenna module of Embodiment 1.
Figure 4:
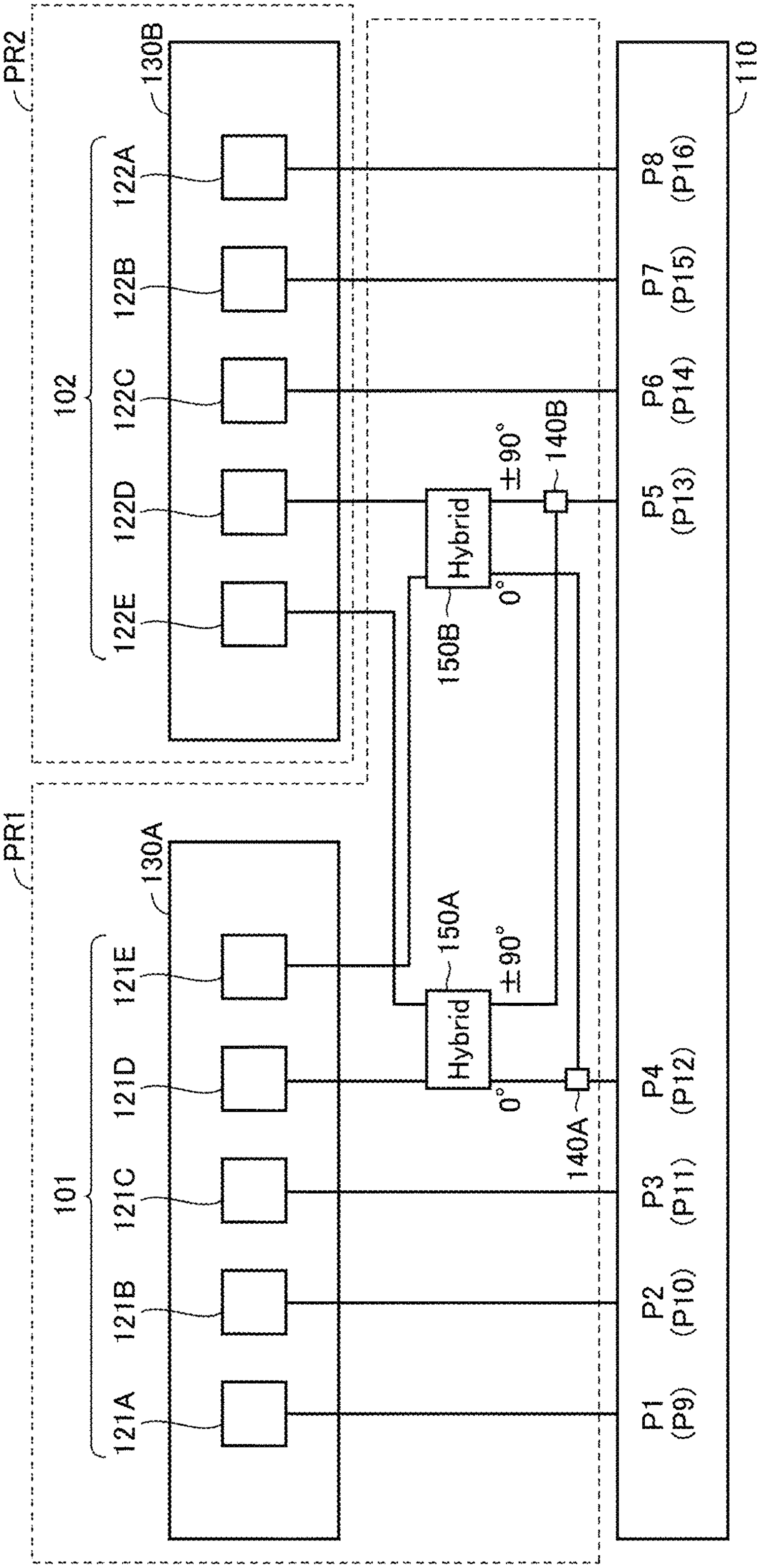
FIG. 4 is a diagram showing the connection state of the antenna module of Embodiment 1.

Next, the configuration of the antenna module 100 in the present embodiment will be described in detail with reference to FIGS. 2 to 4. FIG. 2 is a perspective view of the antenna module 100. FIG. 3 is a diagram for explaining the details of the hybrid coupler 150. FIG. 4 is a diagram showing the connection state in the antenna module 100.

Referring to FIG. 2, the antenna module 100 includes the dielectric substrate 105, the radiating elements 121 and 122, the divider 140, the hybrid coupler 150, and the RFIC 110, as described with reference to FIG. 1. In the following description, the normal direction of the substrate 130A is referred to as the Z axis direction, the normal direction of the substrate 130B is referred to as the X axis direction, and the arrangement direction of the radiating elements in each substrate is referred to as the Y axis direction. A positive direction of the Z axis in each drawing may be referred to as an upper surface side, and a negative direction may be referred to as a lower surface side.

The dielectric substrate 105 is, for example, a low temperature co-fired ceramics (LTCC) multilayer substrate, a multilayer resin substrate formed by laminating a plurality of resin layers configured with a resin such as epoxy or polyimide, a multilayer resin substrate formed by laminating a plurality of resin layers configured with a liquid crystal polymer (LCP) having a lower dielectric constant, a multilayer resin substrate formed by laminating a plurality of resin layers configured with a fluororesin, or a ceramic multilayer substrate other than LTCC. The dielectric substrate 105 needs not necessarily have a multilayer structure, and may be a single layer substrate.

In the antenna device 120 of the antenna module 100, the dielectric substrate 105 has a substantially L-shaped cross sectional shape, and includes a flat plate-shaped substrate 130A that has the Z axis direction as the normal direction, a flat plate-shaped substrate 130B that has the X axis direction as the normal direction, and a bent portion 135 that connects the two substrates 130A and 130B. In Embodiment 1, the substrate 130A corresponds to the "first substrate" of the present disclosure, and the substrate 130B corresponds to the "second substrate" of the present disclosure.

In the antenna module 100, five radiating elements are disposed in a row in the Y axis direction in each of the two substrates 130A and 130B. In the following description, for ease of understanding, an example will be described in which the radiating elements 121 and 122 are disposed to be exposed on the surfaces of the substrates 130A and 130B, but the radiating elements 121 and 122 may be disposed inside the substrates 130A and 130B.

The substrate 130A has a substantially rectangular shape, and five radiating elements 121A to 121E of the first antenna group 101 are disposed in a row in the Y axis direction on the surface thereof. In addition, a System In Package (SiP) module 125, in which the RFIC 110, the divider 140, the hybrid coupler 150, a power module IC (not shown), and the like are built in, and a connector (not shown) are mounted on a lower surface side (a surface in a negative direction of the Z axis) of the substrate 130A. By connecting the connector disposed on the lower surface to a connector disposed on the surface of a mounting substrate (not shown), the substrate 130A is mounted on the mounting substrate. The substrate 130A may be mounted on the mounting substrate by solder connection instead of the connector.

The substrate 130B is connected to the bent portion 135 that is bent from the substrate 130A, and is disposed to be substantially 90° with respect to the substrate 130A. The substrate 130B has a configuration in which a plurality of notched portions 136 are formed on a substantially rectangular dielectric substrate, and the bent portion 135 is connected to the notched portions 136. In other words, in the substrate 130B, in a portion where the notched portion 136 is not formed, a protruding portion 133 that protrudes in a direction (that is, the positive direction of the Z axis) toward the substrate 130A along the substrate 130B from a boundary portion 134 where the bent portion 135 and the substrate 130B are connected is formed. The position of the protruding end of the protruding portion 133 is positioned in the positive direction of the Z axis rather than a surface on the lower surface side of the substrate 130A, that is, on a surface on which the SiP module 125 is mounted.

The protruding portion 133 of the substrate 130B in the antenna module 100 is disposed with the radiating elements 122A to 122E of the second antenna group 102 to correspond to the radiating elements 121A to 121E disposed on the substrate 130A. At least a part of each of the radiating elements 122A to 122E on the substrate 130B is disposed to overlap the protruding portion 133. In a case where the substrate 130A is viewed in a plan view from the normal direction, the radiating elements 122A to 122E are disposed in a row in the X axis direction with respect to the radiating elements 121A to 121E, respectively.

Although not shown in the drawing, in the substrates 130A and 130B and the bent portion 135, ground electrodes are disposed on the inner layer of the surface opposite to the surfaces on which the radiating elements 121 and 122 are disposed while being separated from the radiating elements 121 and 122. A high frequency signal is transmitted from the RFIC 110 in the SiP module 125 to the radiating element 121 of the substrate 130A via a power supply wiring which passes through the inside of the substrate 130A. The power supply wiring is connected to a power supply point SP1 in each radiating element. The power supply point SP1 is disposed at a position offset in the negative direction of the Y axis from the center of each of the radiating elements 121. In a case where the high frequency signal is supplied to the power supply point SP1, a radio wave having the Y axis direction as a polarization direction is radiated in the positive direction of the Z axis.

In addition, the radiating element 122 of the substrate 130B receives the high frequency signal from the RFIC 110 via the power supply wiring which passes through the inside of the dielectrics of the substrate 130A, the bent portion 135, and the substrate 130B. The power supply wiring is connected to a power supply point SP2 in each of the radiating elements 122. The power supply point SP2 is disposed at a position offset in the negative direction of the Y axis from the center of each of the radiating elements. In a case where the high frequency signal is supplied to the power supply point SP2, a radio wave having the Y axis direction as the polarization direction is radiated in the positive direction of the X axis.

Referring to FIG. 3, the hybrid coupler 150 has a configuration in which two input terminals IN1 and IN2, two output terminals OUT1 and OUT2, two first lines 151 having characteristic impedance Zo, and two second lines 152 having impedance $Zo/\sqrt{2}$ are combined.

More specifically, one second line 152 is connected between the input terminal IN1 (first input terminal) and the output terminal OUT1 (first output terminal), and another second line 152 is connected between the input terminal IN2 (second input terminal) and the output terminal OUT2 (second output terminal). In addition, the input terminal IN1 and the input terminal IN2 are connected by one first line 151, and the output terminal OUT1 and the output terminal OUT2 are connected by another first line 151. In a case where a wavelength of the high frequency signal supplied to each radiating element in the dielectric substrate 105 is denoted by A, the lengths of the first line 151 and the second line 152 are each set to $\lambda/4$.

The corresponding radiating element 121 is connected to the output terminal OUT1 via the power supply wiring 171. In addition, the corresponding radiating element 122 is connected to the output terminal OUT2 via the power supply wiring 172. A difference between the wiring length L1 of the power supply wiring 171 and the wiring length L2 of the power supply wiring 172 is set to nA (n is an integer of 0 or more). Therefore, when in-phase high frequency signals are output from the output terminals OUT1 and OUT2, the radiating elements 121 and 122 radiate in-phase radio waves.

In the hybrid coupler 150, in a case where a high frequency signal having a phase difference of +90° with respect to the input terminal IN1 is supplied to the input terminal IN2, a high frequency signal with twice the power is output from the output terminal OUT1, but no high frequency signal is output from the output terminal OUT2.

On the contrary, in a case where a high frequency signal having a phase difference of −90° with respect to the input terminal IN1 is supplied to the input terminal IN2, a high frequency signal having twice the power is output from the output terminal OUT2, but no high frequency signal is output from the output terminal OUT1.

In addition, in a case where a phase difference α between the high frequency signal supplied to the input terminal IN1 and the high frequency signal supplied to the input terminal IN2 is adjusted to a range of −90°<<α<90°, power at a ratio corresponding to the phase difference is output from the output terminals OUT1 and OUT2. For example, when the phase difference α=0° is adjusted, high frequency signals having the same magnitude of power are output from the output terminals OUT1 and OUT2. That is, the hybrid coupler 150 functions as a combiner and a splitter.

In the hybrid coupler 150 of the present Embodiment 1, as shown in FIG. 4, the phase difference α between the signal from the output port P5 and the signal from the output port P4 is set to +90° or −90°. In a case where the phase difference α is set to +90°, the signal from the hybrid coupler 150A is supplied to the radiating element 121D of the first antenna group 101, and the signal from the hybrid coupler 150B is supplied to the radiating element 121E of the first antenna group 101.

On the other hand, in a case where the phase difference α is set to −90°, the signal from the hybrid coupler 150A is supplied to the radiating element 122E of the second antenna group 102, and the signal from the hybrid coupler 150B is supplied to the radiating element 122D of the second antenna group 102.

As described above, since the signal split by the divider 140 (140A, and 140B) is supplied to each input terminal of the hybrid coupler 150 (150A and 150B respectively), the power of the signal received by each input terminal is ½ of the power of the signal output from each output port. In the present Embodiment 1, since the phase difference is set to +90° or −90°, the power of the signal output from each output terminal of the hybrid coupler 150 is equivalent to the power of the signal output from each output port as a result.

In the antenna module 100 of Embodiment 1, it is not possible to simultaneously radiate radio waves from both the radiating elements 121 (121A-121E) and 122 (122E-122A) of the first antenna group 101 and the second antenna group 102, and the radio waves are alternately radiated from the first antenna group 101 and the second antenna group 102. In a case where the radio wave is radiated from the first antenna group 101, the radio wave is radiated from the radiating elements 121D and 121E of the first antenna group 101 using the power from the output port P5 for the second antenna group 102. In addition, in a case where the radio wave is radiated from the second antenna group 102, the radio wave is radiated from the radiating elements 122D and 122E of the second antenna group 102 by using the power from the output port P4 of the first antenna group 101.

In this way, by using the divider and the hybrid coupler to utilize the signal from the antenna group that does not radiate the radio wave, it is possible to radiate the radio wave using a larger number of radiating elements than the output ports. Therefore, compared to a configuration in which the output port and the radiating element are connected to each other in a 1:1 ratio, the peak gain of the radio wave radiated from each antenna group can be increased.

A high frequency signal, which is up-converted by the RFIC 110, passes through the divider 140 and the hybrid coupler 150. In general, as the frequency of the signal increases, the loss in a transmission path increases. Therefore, in order to reduce the loss, it is desirable to make the transmission path from the RFIC 110, which includes the divider 140 and the hybrid coupler 150, to the radiating elements 121 and 122 as short as possible. Therefore, in a case where the SiP module 125 including the RFIC 110 is disposed on the substrate 130A as shown in FIG. 2, it is preferable that the elements including the divider 140 and the hybrid coupler 150 in a dashed line region PR1 of FIG. 4 are disposed on the substrate 130A, and the elements in a dashed line region PR2 are disposed on the substrate 130B.

In the antenna module 100 of Embodiment 1, a so-called single band type and single polarization type antenna module that radiates radio waves in one frequency band in one polarization direction is described as an example. In a case of a dual-band type antenna module that can radiate radio waves in two different frequency bands or a dual-polarization type antenna module that can radiate radio waves in two different polarization directions, the RFIC 110 further requires the corresponding radiating element and the output port for the polarization in the RFIC 110.

For example, in the case of the dual-polarization type antenna module, as shown in FIG. 4, the output ports P9 to P12 are assigned to the first antenna group 101 as the output ports of the high frequency signal for second polarization, and the output ports P13 to P16 are assigned to the second antenna group 102. In this case as well, by connecting the divider and the hybrid coupler as shown in FIG. 4, it is possible to increase the peak gain for the radio waves in a second polarization direction.

Figure 5:
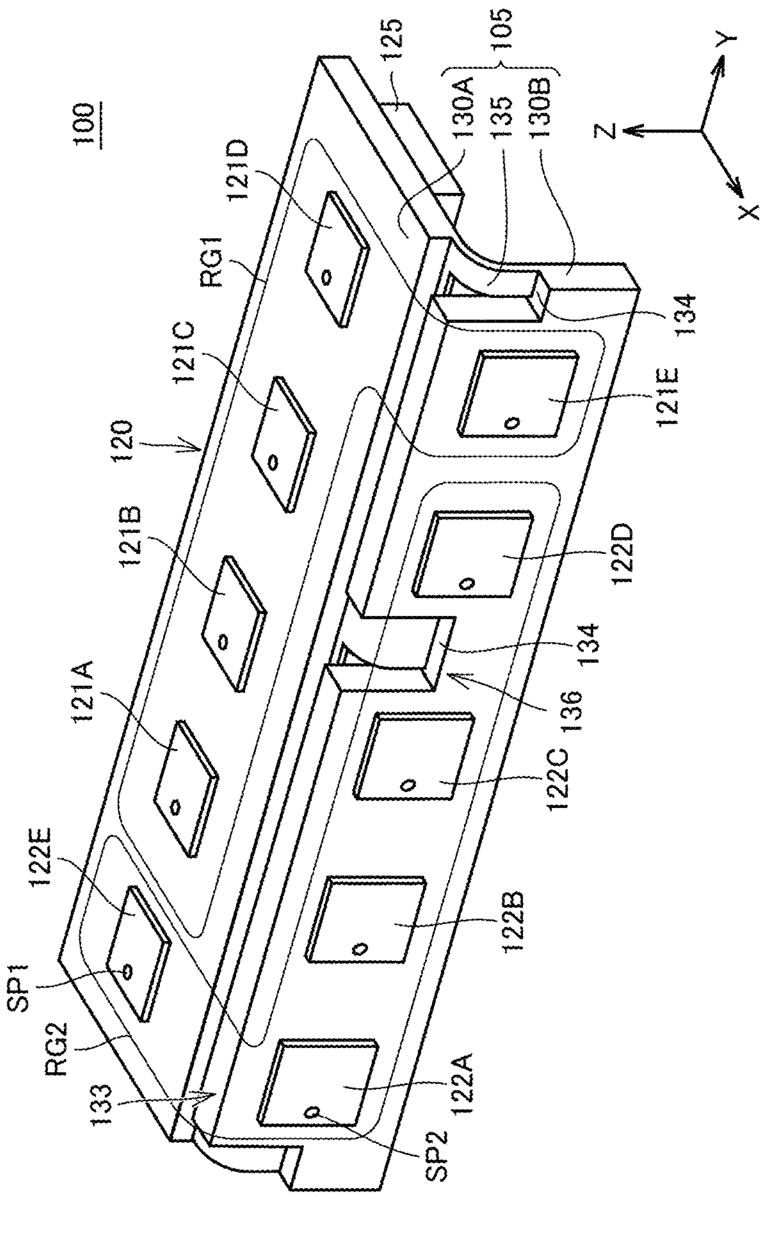
FIG. 5 is a diagram for explaining another example of the disposition of radiating elements of each antenna group.

In FIG. 2, the configuration is described in which the radiating elements 121 of the first antenna group 101 are disposed on the substrate 130A and the radiating elements 122 of the second antenna group 102 are disposed on the substrate 130B, but a configuration may be adopted in which some of the radiating elements of each antenna group are disposed on the other substrate, as shown in FIG. 5. Specifically, in the antenna module of FIG. 5, the radiating elements 121A to 121D in the first antenna group 101 are disposed on the substrate 130A, and the radiating element 121E is disposed on substrate 130B (region RG1). Similarly, the radiating elements 122A to 122D in the second antenna group 102 are disposed on the substrate 130B, and the radiating element 122E is disposed on the substrate 130A (region RG2).

In such a configuration, in a case where the radio waves are radiated from the first antenna group 101, some radio waves are also radiated in the positive direction of the X axis in addition to the radiation in the positive direction of the Z axis. In addition, in a case where the radio waves are radiated from the second antenna group 102, some radio waves are also radiated in the positive direction of the Z axis in addition to the radiation in the positive direction of the X axis. Therefore, the radiation range of the radio waves can be expanded.

Modification Example 1

Figure 6:
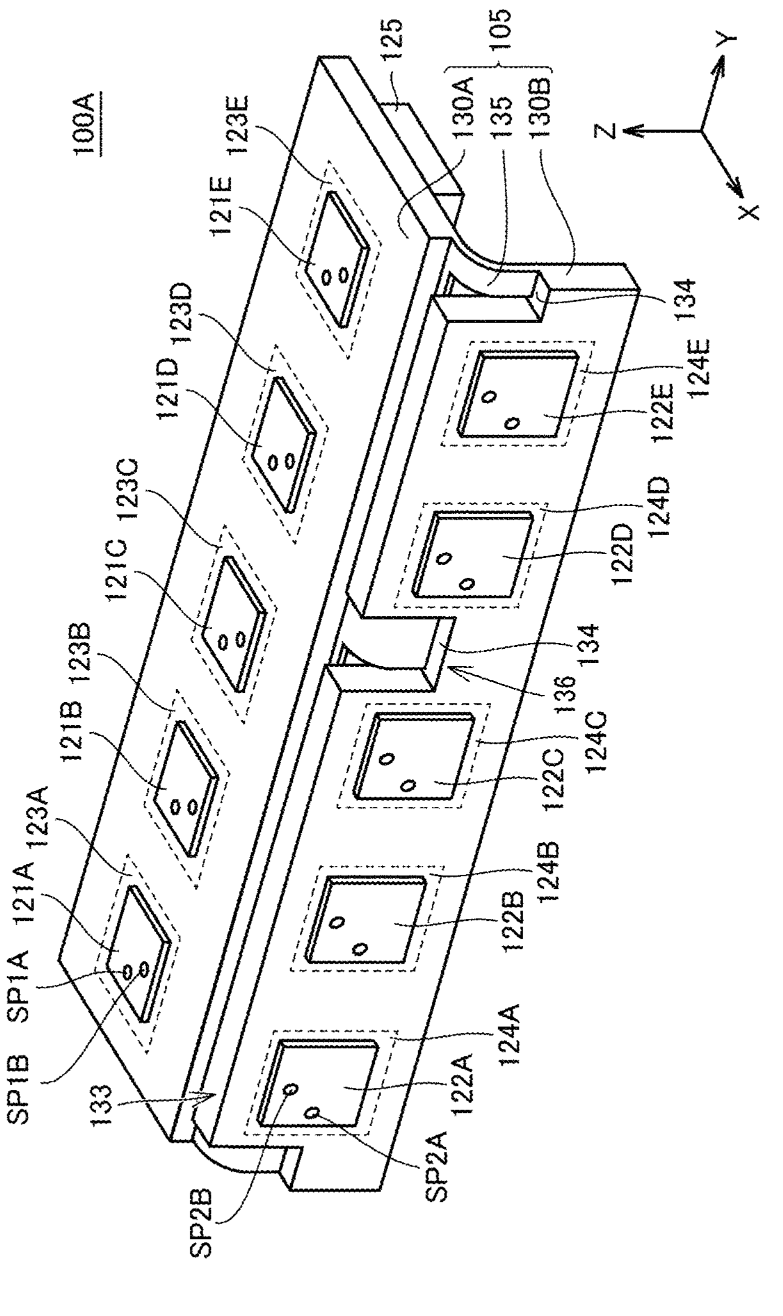
FIG. 6 is a perspective view of an antenna module of Modification Example 1.

FIG. 6 is a perspective view of the antenna module 100A of Modification Example 1. The antenna module 100A is the dual-band type and dual-polarization type antenna module that can radiate radio waves in two different frequency bands from the plurality of radiating elements disposed on each of the substrates 130A and 130B and can radiate the radio waves of each of the frequency bands in two different polarization directions.

The antenna module 100A further includes the radiating elements 123A to 123E disposed on the substrate 130A and the radiating elements 124A to 124 disposed on the substrate 130B, in addition to the configuration of the antenna module 100 in FIG. 1. In the following description, the radiating elements 123A to 123E may be collectively referred to as a "radiating element 123," and the radiating elements 124A to 124E may be collectively referred to as a "radiating element 124."

The element size of the radiating elements 123 and 124 is larger than the element size of the radiating elements 121 and 122. Therefore, the radiating elements 123 and 124 radiate radio waves in a frequency band lower than the radiating elements 121 and 122. For example, the center frequency of the radio waves radiated from the radiating elements 121 and 122 is 39 GHz, and the center frequency of the radio waves radiated from the radiating elements 123 and 124 is 28 GHz.

In the substrate 130A, the radiating element 123 is disposed in a layer between the radiating element 121 and the ground electrode disposed on the substrate 130A. In a case where the substrate 130A is viewed in a plane from the normal direction (Z axis direction), the radiating element 121 and the radiating element 123 overlap each other such that their centers coincide. That is, the stacked patch antenna is formed by the radiating elements 121, 123, and the ground electrode.

In the radiating element 121, the power supply point SP1A is disposed at a position offset in a negative direction of the Y axis from the center of the radiating element 121, and the power supply point SP1B is disposed at a position offset in a positive direction of the X axis from the center of the radiating element 121. In a case where the high frequency signal is supplied to the power supply point SP1A, a radio wave having the Y axis direction as the polarization direction is radiated in the positive direction of the Z axis. In addition, in a case where the high frequency signal is supplied to the power supply point SP1B, a radio wave having the X axis direction as the polarization direction is radiated in the positive direction of the Z axis.

Although not shown in FIG. 6, for the radiating element 123, the power supply points are also disposed at a position offset in the X axis direction and a position offset in the Y axis direction from the center of the radiating element 123. The radiating element 123 also radiates a radio wave having the X axis direction as the polarization direction and a radio wave having the Y axis direction as the polarization direction. A high frequency signal may be transmitted to the radiating element 123 using a power supply wiring separated from the radiating element 121, or a high frequency signal may be transmitted using a power supply wiring for the radiating element 121 that penetrates the radiating element 123.

In the substrate 130B, the radiating element 124 is disposed in a layer between the radiating element 122 and the ground electrode disposed on the substrate 130B. In a case where the substrate 130B is viewed in a plane from a normal direction (X axis direction), the radiating element 122 and the radiating element 124 overlap each other such that their centers coincide. That is, the stacked patch antenna is formed by the radiating elements 122, 124, and the ground electrode.

In the radiating element 122, the power supply point SP2A is disposed at a position offset in the negative direction of the Y axis from the center of the radiating element 122, and the power supply point SP2B is disposed at a position offset in the positive direction of the Z axis from the center of the radiating element 122. In a case where the high frequency signal is supplied to the power supply point SP2A, a radio wave having the Y axis direction as the polarization direction is radiated in the positive direction of the X axis. In addition, in a case where the high frequency signal is supplied to the power supply point SP2B, a radio wave having the Z axis direction as the polarization direction is radiated in the positive direction of the X axis.

Although not shown in FIG. 6, for the radiating element 124, the power supply points are disposed at a position offset in the X axis direction and a position offset in the Y axis direction from the center of the radiating element 124. The radiating element 124 also radiates a radio wave having the Y axis direction as the polarization direction and a radio wave having the Z axis direction as the polarization direction. A high frequency signal may be transmitted to the radiating element 124 by using a power supply wiring separated from the radiating element 122, or a high frequency signal may be transmitted by using a power supply wiring for the radiating element 122 that penetrates the radiating element 124.

Even in an antenna module having such a configuration, by making connection as shown in FIG. 4 by using the dividers and the hybrid couplers for each polarization of each frequency band, even in a case where the number of output ports of the RFIC is smaller than the number of radiating elements, it is possible to increase the peak gain.

(Comparison of Antenna Characteristics)

Figure 7:
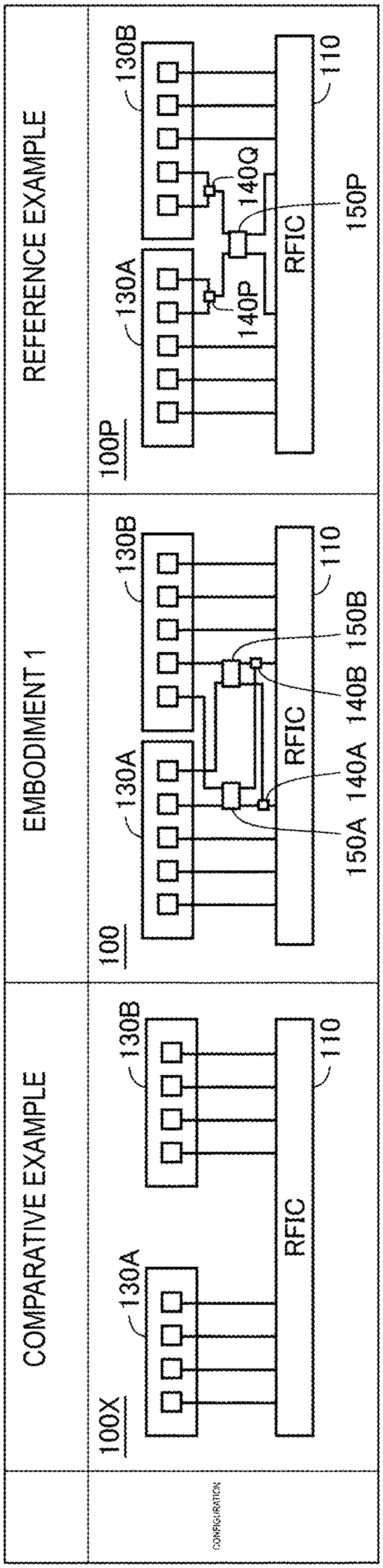
FIG. 7 is a diagram showing the connection states of the antenna module of Embodiment 1, Comparative Example, and Reference Example.
Figure 8:
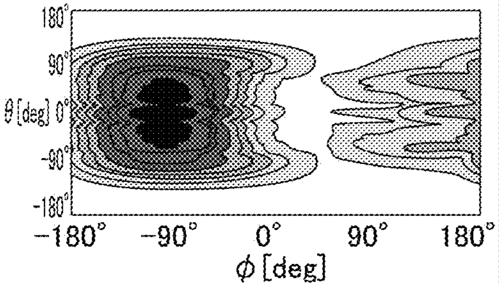
FIG. 8 is a diagram for explaining gain distribution in radiating elements on a low frequency (28 GHz) side.
Figure 8:
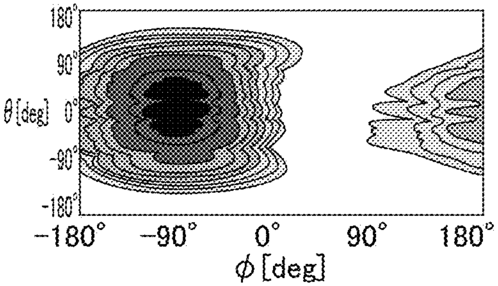
Figure 8:
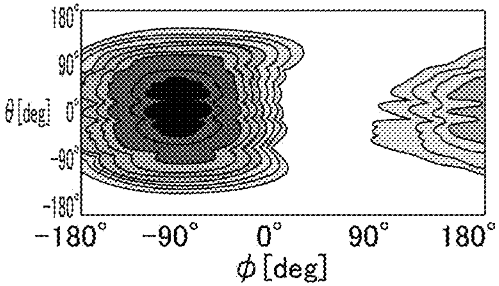
Figure 9:
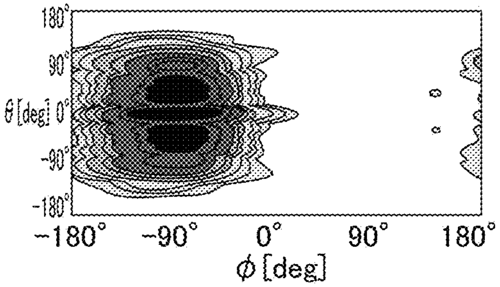
FIG. 9 is a diagram for explaining gain distribution in radiating elements on a high frequency (39 GHz) side.
Figure 9:
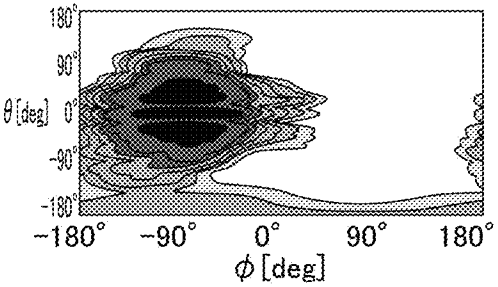
Figure 9:
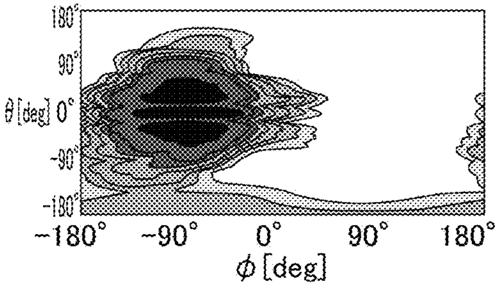

Next, the simulation results of the antenna characteristics of the antenna module of Embodiment 1 will be described with reference to FIGS. 7 to 9. In FIGS. 7 to 9, the antenna module 100X of Comparative Example and an antenna module 100P of Reference Example are also shown together. The simulation is performed using a dual-band and dual-polarization type antenna module such as the antenna module 100A of Modification Example 1.

FIG. 7 is a diagram showing the connection states of the antenna module of Embodiment 1, Comparative Example, and Reference Example. FIG. 8 is a diagram for explaining gain distribution in radiating elements on a low frequency (28 GHz) side. FIG. 9 is a diagram for explaining gain distribution in the radiating elements on a high frequency (39 GHz) side. FIGS. 8 and 9 show examples of the gain distribution in a case where the radiating elements 121 and 123 of the substrate 130A simultaneously radiate radio waves in two polarization directions.

Referring to FIG. 7, in the antenna module 100X of Comparative Example, four radiating elements are disposed on each substrate, and the antenna port of the RFIC 110 is connected to each radiating element in a 1:1 ratio. In addition, the antenna module 100P of Reference Example has a configuration in which five radiating elements are disposed on each substrate as in the antenna module 100 of Embodiment 1 but the power supply wiring is branched by a divider 140P and a divider 1400 on the output side of the hybrid coupler 150P.

In FIGS. 8 and 9, the gain distribution in each antenna module is shown on the upper side, and the Cumulative Distribution Function (CDF) is shown on the lower side. In each gain distribution, a horizontal axis represents an angle φ from the X axis direction around the Y axis, and a vertical axis represents an angle θ from the Z axis direction around the X axis. That is, $\varphi=-90°$ indicates the positive direction of the Z axis, and $\varphi=0°$ indicates the positive direction of the X axis. In addition, in each gain distribution, the color of the hatching is shown to be darker as the gain increases.

First, in a case of a 28 GHz band, as shown in FIG. 8, as compared to Comparative Example 1 in which the output ports and the radiating elements are connected at a ratio of 1:1, the number of radiating elements is increased in Embodiment 1 and Reference Example. Therefore, the peak gain (CDF=100%) is increased from 10.16 dBi of Comparative Example 1 to 10.25 dBi in a case of Embodiment 1 and to 10.27 dBi in a case of the Reference Example. However, the gains at CDF=50% are slightly lower than the gain of 1.90 dBi of Comparative Example, with a gain of 1.62 dBi in a case of Embodiment 1 and a gain of 1.64 dBi in a case of Reference Example. That is, in the 28 GHz band, the radiation range is slightly narrower.

Next, in the case of the 39 GHz band, the peak gain is increased to 11.57 dBi in both Embodiment 1 and Reference Example, compared to 10.39 dBi in Comparative Example 1 with reference to FIG. 9. In addition, the gain at CDF=50% is also increased to 0.77 dBi in the case of Embodiment 1 and 0.80 dBi in the case of Reference Example as compared with 0.46 dBi of Comparative Example 1. That is, in the case of the 39 GHz band, the expansion of the radiation range can be realized in addition to the increase in the peak gain.

The reason that the radiation range is narrowed in the case of the 28 GHz band in FIG. 8 is the influence of the pitch between the radiating elements, which is narrower than $\lambda/2$ in the simulation example.

As described above, by using the divider and the hybrid coupler and utilizing the output port assigned to the radiating element of the other antenna group, it is possible to radiate the radio wave using a larger number of radiating elements than the output ports assigned to each antenna group, so that it is possible to increase the peak gain.

In addition, in the case of Embodiment 1 and Reference Example, the number of output ports corresponding to each substrate is increased as compared with Comparative Example 1, so that Equivalent Isotropic Radiated Power (EIRP) in a case where the power is supplied from the corresponding output ports can be increased.

The "hybrid coupler 150A" and the "hybrid coupler 150B" in Embodiment 1 correspond to a "first hybrid coupler" and a "second hybrid coupler" in the present disclosure, respectively. The "divider 140A" and the "divider 140B" in Embodiment 1 correspond to a "first divider" and a "second divider" in the present disclosure, respectively. The "radiating element 121D", the "radiating element 121E", the "radiating element 122E", and the "radiating element 122D" in Embodiment 1 correspond to a "first radiating element", a "second radiating element", a "third radiating element", and a "fourth radiating element" in the present disclosure, respectively.

Embodiment 2

In Embodiment 1, the configuration is described in which one radiating element is added to each antenna group by using the output port corresponding to one radiating element on the other substrate side. In Embodiment 2, an example configuration in which two radiating elements are added to each antenna group will be described.

Figure 10:
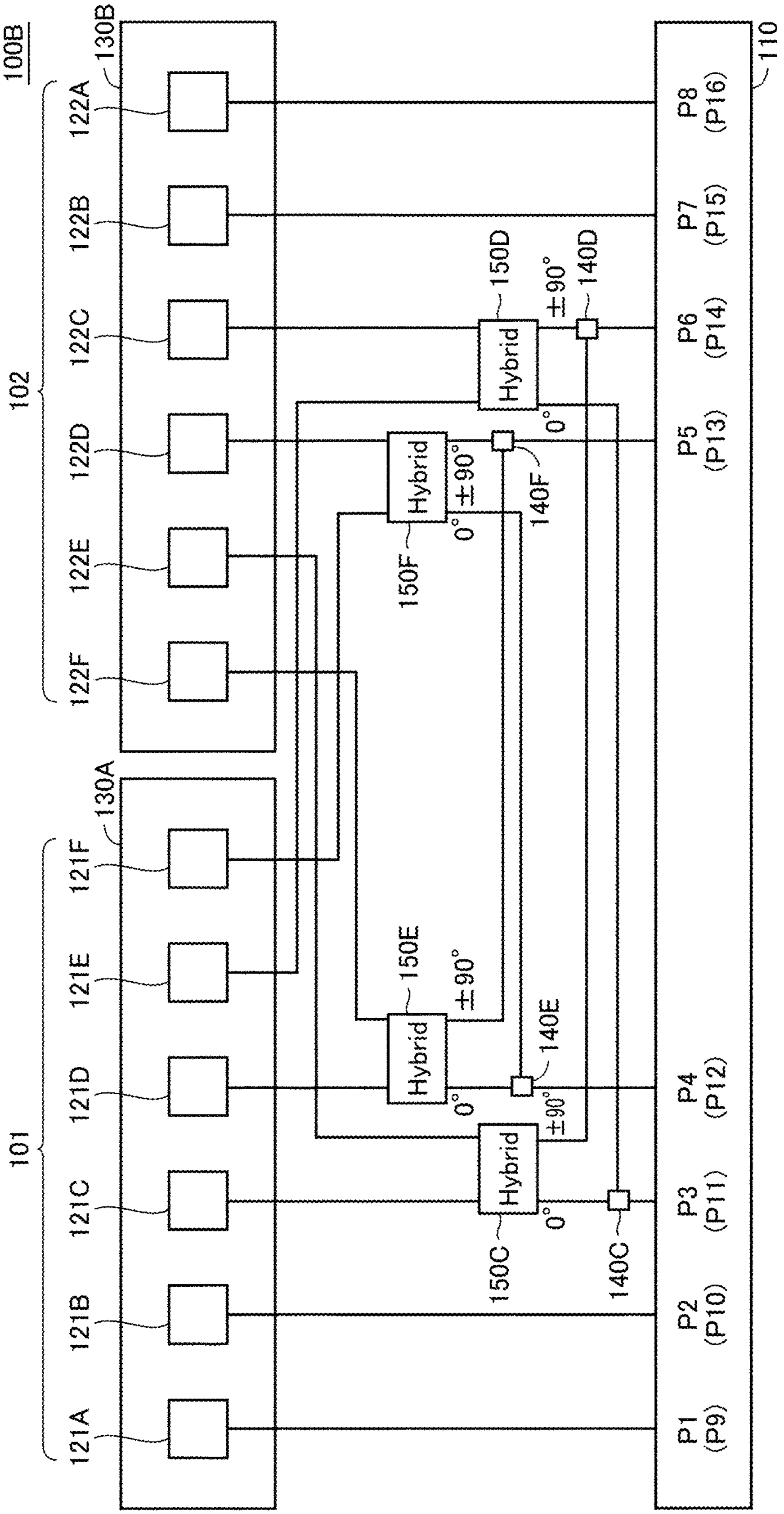
FIG. 10 is a diagram showing the connection state of an antenna module according to Embodiment 2.

FIG. 10 is a diagram showing the connection state of an antenna module 100B according to Embodiment 2. In the antenna module 100B, the first antenna group 101 disposed on the substrate 130A includes six radiating elements 121A to 121F, and the second antenna group 102 disposed on the substrate 130B includes six radiating elements 122A to 122F. In addition, in the antenna module 100B, four hybrid couplers 150C to 150F and four dividers 140C to 140F are included instead of the hybrid couplers 150A and 150B and the dividers 140A and 140B of the antenna module 100.

The transmission signals from the output ports P1 and P2 of the RFIC 110 are supplied to the radiating elements 121A and 121B of the substrate 130A, respectively. In addition, the transmission signals from the output ports P7 and P8 are supplied to the radiating elements 122B and 122A of the substrate 130B, respectively.

The transmission signal from the output port P3 is split in two directions by the divider 140C and is supplied to one input terminal of each of the hybrid couplers 150C and 150D. In addition, the transmission signal from the output port P6 is split in two directions by the divider 140D and is supplied to the other input terminals of each of the hybrid couplers 150C and 150D. Two output terminals of the hybrid coupler 150C are connected to the radiating elements 121C and 122E, respectively. Two output terminals of the hybrid coupler 150D are connected to the radiating elements 121E and 122C, respectively.

The transmission signal from the output port P4 is split in two directions by the divider 140E and is supplied to one input terminal of each of the hybrid couplers 150E and 150F. In addition, the transmission signal from the output port P5 is split in two directions by the divider 140F and is supplied to the other input terminal of each of the hybrid couplers 150E and 150F. The two output terminals of the hybrid coupler 150E are connected to the radiating elements 121D and 122F, respectively. Two output terminals of the hybrid coupler 150F are connected to the radiating elements 121F and 122D, respectively.

In the hybrid couplers 150C and 150D, in a case where the phase difference between the signal from the output port P3 and the signal from the output port P6 is set to +90°, the signal from the hybrid coupler 150C is supplied to the radiating element 121C of the first antenna group 101, and the signal from the hybrid coupler 150D is supplied to the radiating element 121E of the first antenna group 101. On the other hand, in a case where the phase difference is set to −90°, the signal from the hybrid coupler 150C is supplied to the radiating element 122E of the second antenna group 102, and the signal from the hybrid coupler 150D is supplied to the radiating element 122C of the second antenna group 102.

Similarly, in the hybrid couplers 150E and 150F, in a case where the phase difference between the signal from the output port P4 and the signal from the output port P5 is set to +90°, the signal from the hybrid coupler 150E is supplied to the radiating element 121D of the first antenna group 101, and the signal from the hybrid coupler 150F is supplied to the radiating element 121F of the first antenna group 101. On the other hand, in a case where the phase difference is set to −90°, the signal from the hybrid coupler 150E is supplied to the radiating element 122F of the second antenna group 102, and the signal from the hybrid coupler 150F is supplied to the radiating element 122D of the second antenna group 102.

Therefore, by outputting the signal having a phase difference of +90° from the output ports P5 and P6 with respect to the transmission signals of the output ports P1 to P4, it is possible to radiate radio waves from the six radiating elements 121A to 121F of the first antenna group 101. In addition, by outputting the signals having a phase difference of −90° from the output ports P5 to P8 with respect to the transmission signals of the output ports P3 and P4, it is possible to radiate radio waves from the six radiating elements 122A to 122F of the second antenna group 102.

In this way, by using the output ports corresponding to the two radiating elements on the other substrate side, two radiating elements can be added to each antenna group, and thus it is possible to increase the peak gain.

Similarly, in a case where the output ports of the RFIC 110 are eight, the radio waves can be radiated from seven radiating elements for each antenna group by using six dividers and hybrid couplers. Further, the radio waves can be radiated from eight radiating elements for each antenna group by using the eight dividers and the hybrid coupler. In addition, in the case of the dual-band type antenna module and/or the dual-polarization type antenna module, the number of radiating elements to be used can be increased by adopting the same connection configuration as in FIG. 10 for the circuits with respect to the corresponding frequency band and the polarization.

The "hybrid coupler 150C" to the "hybrid coupler 150F" in Embodiment 2 correspond to a "first hybrid coupler" to a "fourth hybrid coupler" in the present disclosure, respectively. The "divider 140C" to the "divider 140F" in Embodiment 2 correspond to a "first divider" to a "fourth divider" in the present disclosure, respectively. The "radiating element 121C", the "radiating element 121E", the "radiating element 122E", the "radiating element 122C", the "radiating element 121D", the "radiating element 121F", the "radiating element 122F", and the "radiating element 122D" in Embodiment 2 correspond to a "first radiating element" to an "eighth radiating element" in the present disclosure, respectively.

Embodiment 3

In the antenna module 100 of Embodiment 1, the configuration is described in which the radiating elements of each of the substrates are disposed in a row in the Y axis direction. In Embodiment 3, a configuration in which the radiating elements of each of the substrates are two-dimensionally arranged will be described.

Figure 11:
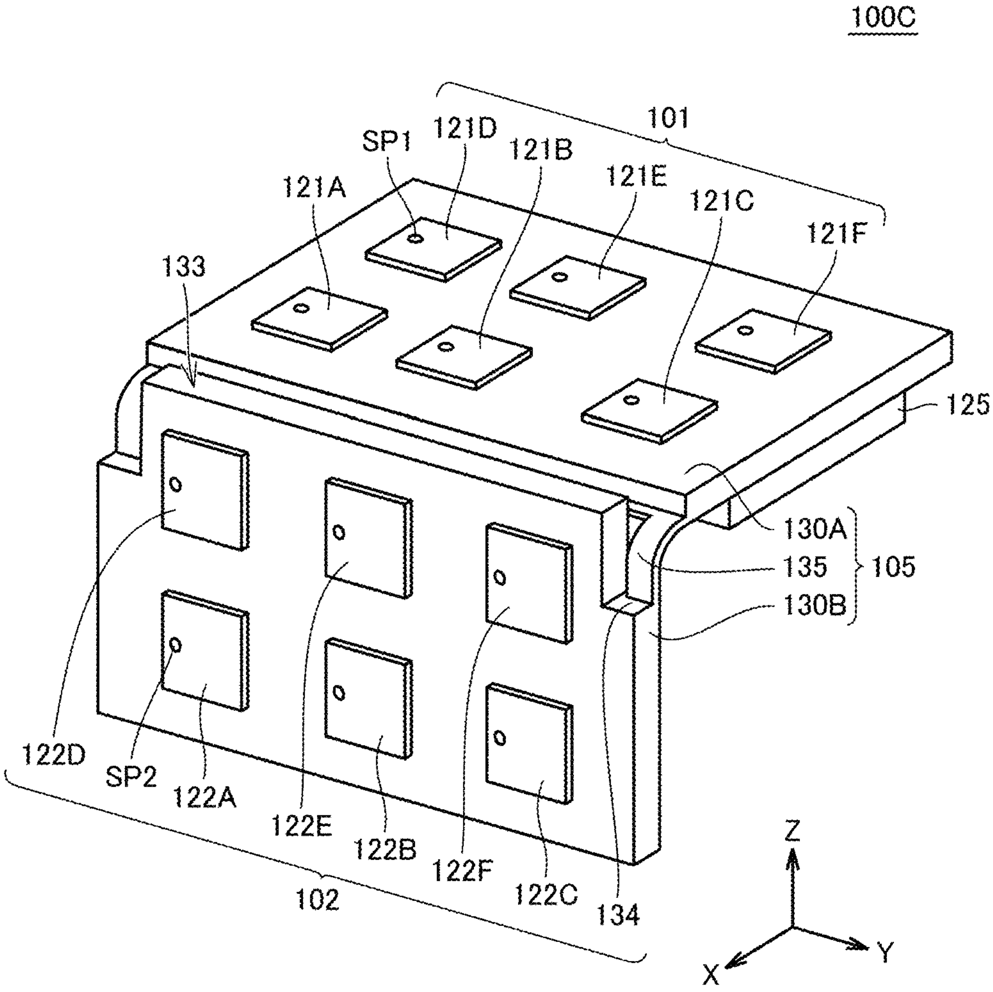
FIG. 11 is a perspective view of an antenna module according to Embodiment 3.

FIG. 11 is a perspective view of an antenna module 100C according to Embodiment 3. With reference to FIG. 11, in the antenna module 100C, similarly to FIG. 10, the first antenna group 101 disposed on the substrate 130A includes six radiating elements 121A to 121F, and the second antenna group 102 disposed on the substrate 130B includes six radiating elements 122A to 122F.

In the substrate 130A, a set of radiating elements 121A to 121C and a set of radiating elements 121D to 121F are disposed in rows along the Y axis direction. The radiating elements 121D to 121F are disposed adjacent to the radiating elements 121A to 121C, respectively, in the negative direction of the X axis. That is, the first antenna group 101 has a configuration in which the radiating elements 121A to 121F are two-dimensionally arranged of 2×3.

Similarly, in the substrate 130B, a set of radiating elements 122A to 122C and a set of radiating elements 122D to 122F are disposed in rows along the Y axis direction. The radiating elements 122D to 122F are disposed adjacent to the radiating elements 122A to 122C in the positive direction of the Z axis. That is, the second antenna group 102 has a configuration in which the radiating elements 122A to 122F are two-dimensionally arranged of 2×3.

In this way, by arranging the radiating elements of each substrate in a two-dimensional array, the radiated radio waves can be tilted in two directions, and thus it is possible to expand the radiation range of the radio waves. In addition, since the radio waves can be radiated by using a larger number of radiating elements than the number of output ports assigned to each antenna group by using the output ports corresponding to the radiating elements on the other substrate side, and thus it is possible to increase the peak gain.

Modification Example 2

In Modification Example 2, a configuration in which eight radiating elements are two-dimensionally arranged on each substrate will be described.

Figure 12:
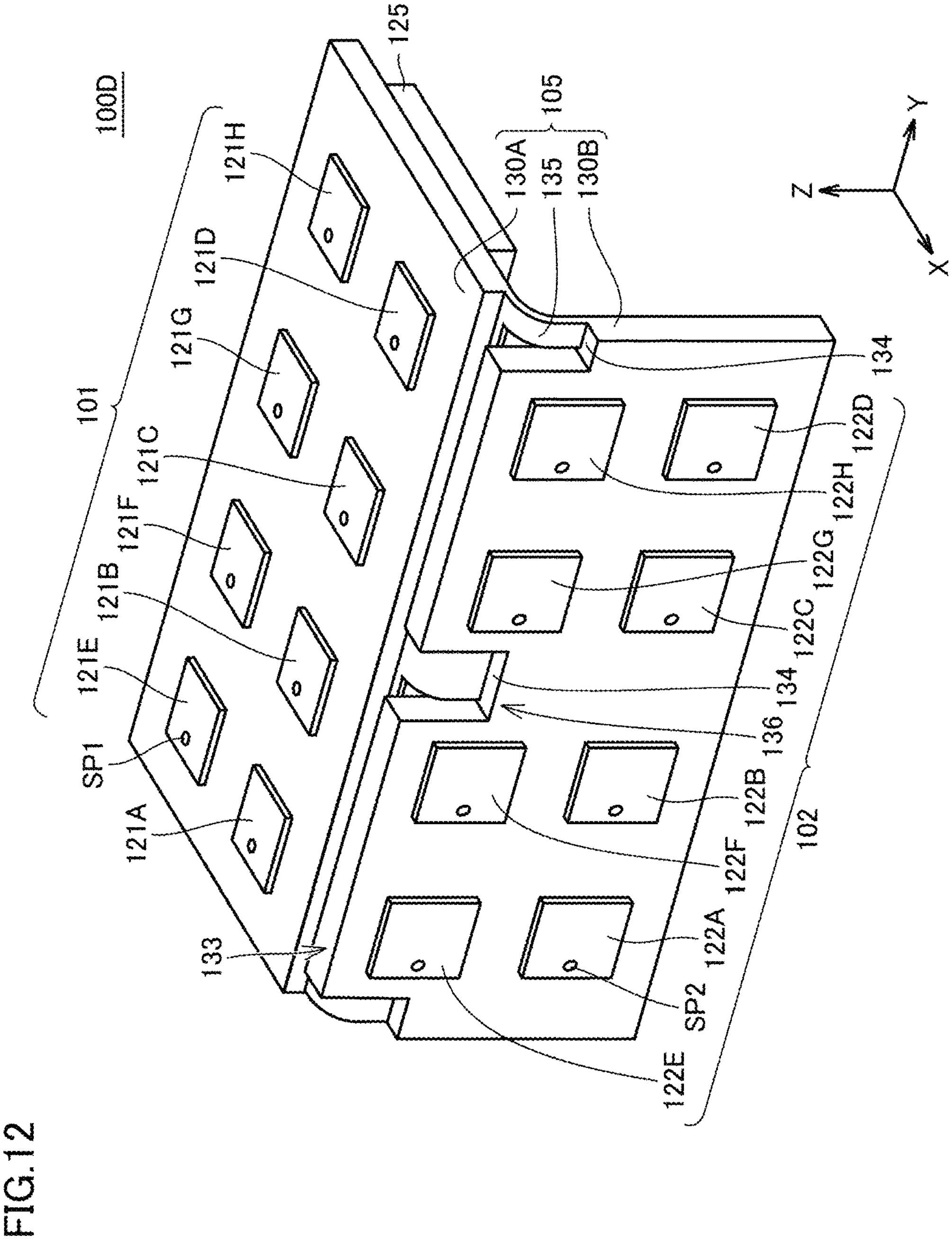
FIG. 12 is a perspective view of an antenna module of Modification Example 2.

FIG. 12 is a perspective view of an antenna module 100D of Modification Example 2. Referring to FIG. 12, in the antenna module 100D, the first antenna group 101 disposed on the substrate 130A includes eight radiating elements 121A to 121H, and the second antenna group 102 disposed on the substrate 130B includes eight radiating elements 122A to 122H. In this case, eight hybrid couplers and eight dividers are used.

In the substrate 130A, a set of radiating elements 121A to 121D and a set of radiating elements 121E to 121H are disposed in rows along the Y axis direction. The radiating elements 121E to 121H are disposed adjacent to the radiating elements 121A to 121D in the negative direction of the X axis, respectively. That is, the first antenna group 101 has a configuration in which the radiating elements 121A to 121H are two-dimensionally arranged of 2×4.

Similarly, in the substrate 130B, a set of radiating elements 122A to 122D and a set of radiating elements 122E to 122H are disposed in rows along the Y axis direction. The radiating elements 122E to 122H are disposed adjacent to the radiating elements 122A to 122D in the positive direction along the Z axis, respectively. That is, the second antenna group 102 has a configuration in which the radiating elements 122A to 122H are two-dimensionally arranged of 2×4.

In this way, it is possible to increase the peak gain by having a configuration in which the radiating elements are arranged in a two-dimensional arrangement of 2×4 on each substrate.

Embodiment 4

In the first to third embodiments, the configuration in which the radio waves are radiated in two different directions has been described, but the features of the present disclosure can also be applied to an antenna module that radiates radio waves in three or more different directions.

Figure 13:
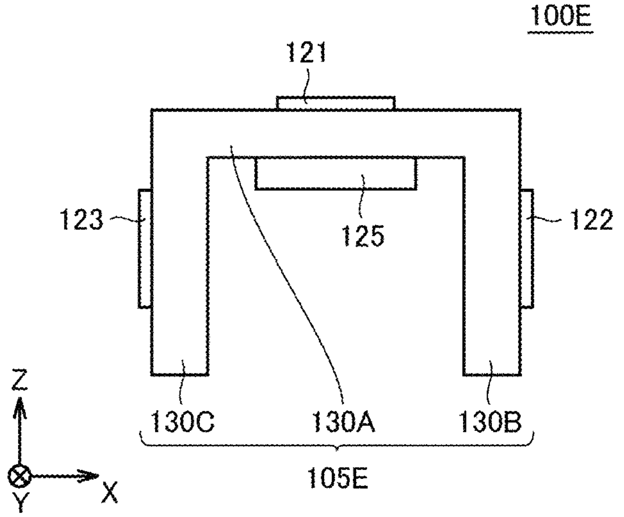
FIG. 13 is a side diagram of an antenna module according to Embodiment 4.

FIG. 13 is a side diagram of an antenna module 100E according to Embodiment 4. In the antenna module 100E, a dielectric substrate 105E includes a substrate 130C in addition to the substrates 130A and 130B. The substrate 130C is connected to an edge of the substrate 130A on a side opposite to an edge to which the substrate 130B is connected, and is disposed to face the substrate 130B. That is, as shown in FIG. 13, a cross section of the dielectric substrate 105E viewed from the Y axis direction has a substantially C-shape.

In the substrate 130C, a radiating element 126 of the third antenna group is disposed on the surface in the negative direction of the X axis. The radiating element 126 radiates radio waves in the negative direction of the X axis.

Even in the antenna module that can radiate radio waves in three different directions, by sharing the output ports of the RFIC are shared with each other using the dividers and the hybrid couplers, even in a case where the number of the output ports is smaller than the number of the radiating elements, it is possible to increase the number of the radiating elements of each antenna group and it is possible to increase the peak gain.

Modification Example 3

Figure 14:
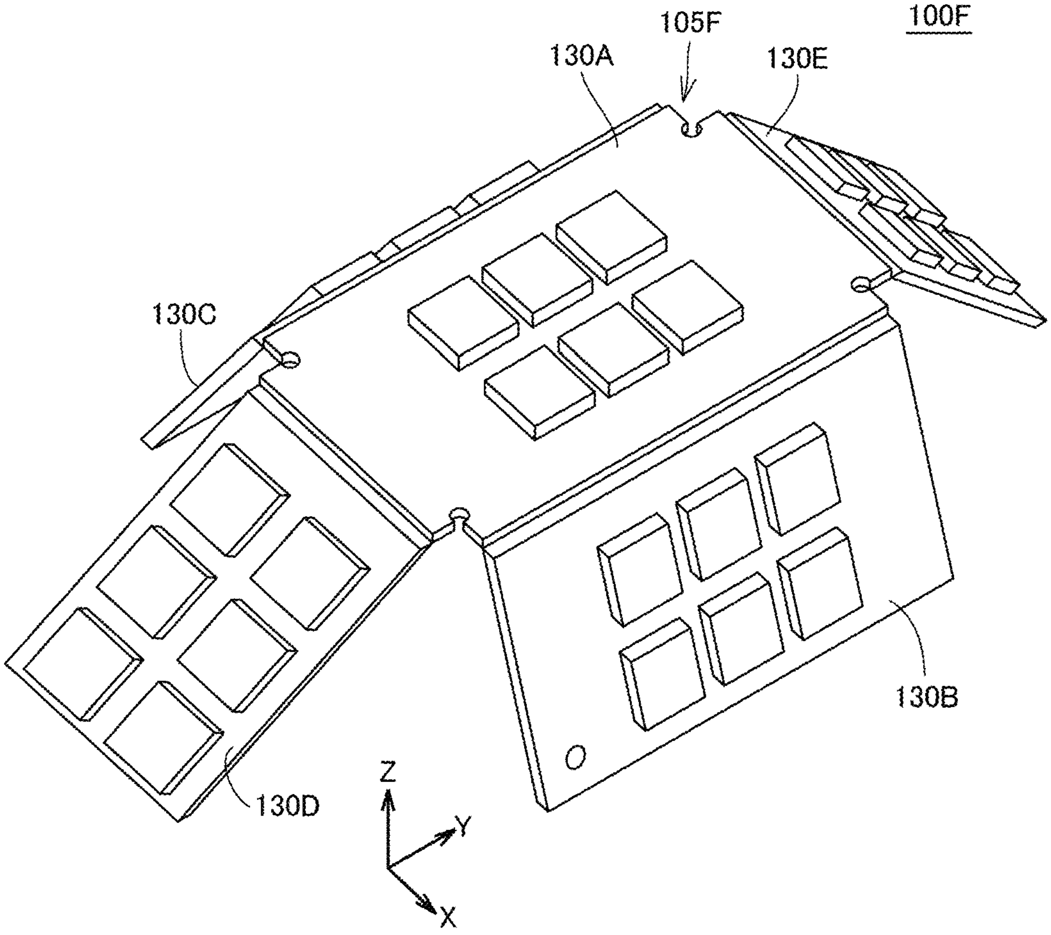
FIG. 14 is a perspective view of an antenna module of Modification Example 3.

FIG. 14 is a perspective view of an antenna module 100F of Modification Example 3. In a dielectric substrate 105F of the antenna module 100F, in addition to the configuration of FIG. 13, substrates 130D and 130E are further added, and a configuration is adopted in which radio waves can be radiated in five different directions.

The substrate 130D is connected to an edge of the Y axis of the substrate 130A in the positive direction, and the substrate 130E is connected to an edge of the substrate 130A in the negative direction of the Y axis. Six radiating elements are disposed in a two-dimensional array on each of the substrates 130A to 130E.

Even in the configuration in which the radio waves can be radiated in five different directions, it is possible to increase the peak gain by sharing the output ports of the RFIC with each other using the dividers and the hybrid couplers.

Embodiment 5

In Embodiments 1 to 4, the configuration is described in which the output port of the RFIC is shared between the two antenna groups. In Embodiment 5, a configuration will be described in which output ports are shared between two polarizations in a dual-polarization type array antenna in which a plurality of radiating elements are disposed on the same substrate.

Figure 15:
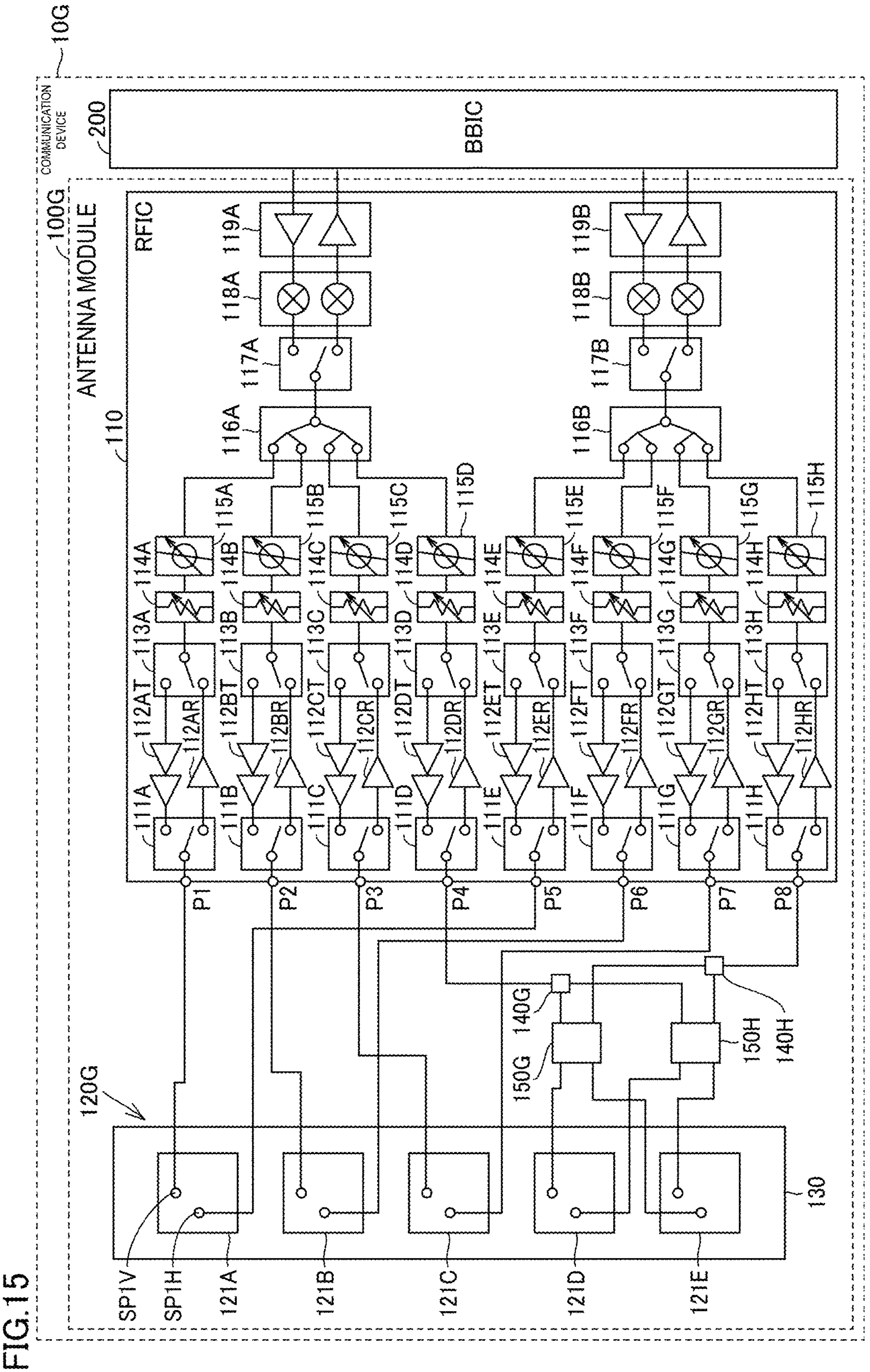
FIG. 15 is a block diagram of a communication device to which an antenna module according to Embodiment 5 is applied.

FIG. 15 is a block diagram of a communication device to which an antenna module 100G according to Embodiment 5 is applied. In addition, FIG. 16 is a diagram showing the connection state of an antenna module 100G.

Figure 16:
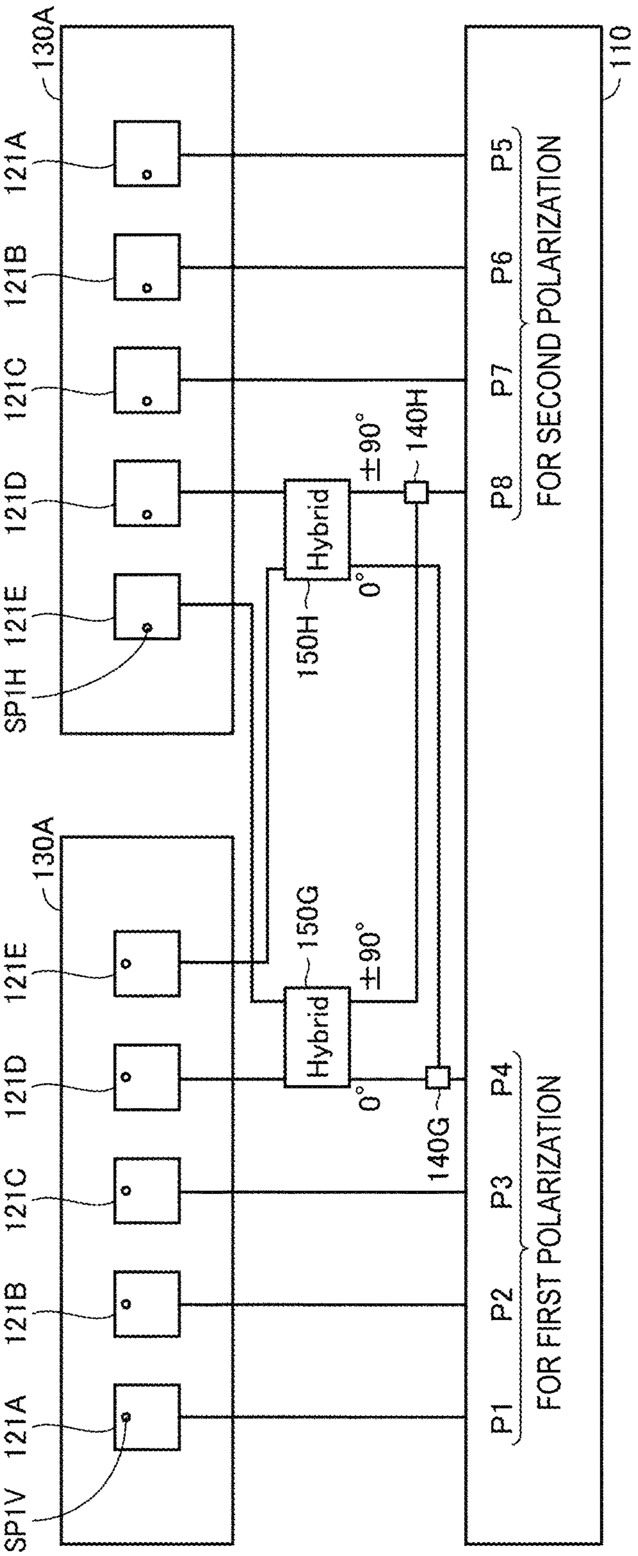
FIG. 16 is a diagram showing the connection state of an antenna module according to Embodiment 5.

Referring to FIGS. 15 and 16, an antenna device 120G of the antenna module 100G has a configuration in which five radiating elements 121A to 121E are disposed on a single dielectric substrate 130. A power supply point SP1V for the first polarization and a power supply point SP1H for the second polarization are disposed on each radiating element.

The transmission signals from the output ports P1, P2, and P3 of the RFIC 110 are supplied to the power supply points SP1V in the radiating elements 121A, 121B, and 121C, respectively. In addition, the transmission signals from the output ports P5, P6, and P7 are supplied to the power supply points SP1H in the radiating elements 121A, 121B, and 121C, respectively.

The transmission signal from the output port P4 is split in two directions by a divider 140G and is supplied to one input terminal of each of the hybrid couplers 150G and 150H. The transmission signal from the output port P8 is split in two directions by a divider 140H and is supplied to the other input terminals of each of the hybrid couplers 150G and 150H.

In the hybrid couplers 150G and 150H, in a case where the phase difference between the signal from the output port P4 and the signal from the output port P8 is set to +90°, the signal from the hybrid coupler 150G is supplied to the power supply point SP1V of the radiating element 121D, and the signal from the hybrid coupler 150H is supplied to the power supply point SP1V of the radiating element 121E. On the other hand, in a case where the phase difference is set to −90°, the signal from the hybrid coupler 150G is supplied to the power supply point SP1H of the radiating element 121E, and the signal from the hybrid coupler 150H is supplied to the power supply point SP1H of the radiating element 121D.

Therefore, by outputting the signals having a phase difference of +90° from the output port P8 with respect to the transmission signals of the output ports P1 to P4, it is possible to radiate radio waves in the first polarization direction from the five radiating elements 121A to 121E. In addition, by outputting the signal having a phase difference of −90° from the output ports P5 to P8 with respect to the transmission signal of the output port P4, it is possible to radiate the radio waves in the second polarization direction from the five radiating elements 122A to 122E.

In this way, in the dual-polarization type array antenna, by using the output port corresponding to the radio wave in the other polarization direction, it is possible to add one radiating element for each polarization direction, so that it is possible to increase the peak gain.

The "radiating element 121D" and the "radiating element 121E" in Embodiment 5 correspond to a "first radiating element" and a "second radiating element" in the present disclosure, respectively. The "hybrid coupler 150G" and the "hybrid coupler 150H" in Embodiment 5 correspond to a "first hybrid coupler" and a "second hybrid coupler" in the present disclosure, respectively. The "divider 140G" and the "divider 140H" in Embodiment 5 correspond to a "first divider" and a "second divider" in the present disclosure, respectively.

Embodiment 6

In the antenna module of each Embodiment described above, the signals output from the two hybrid couplers paired with each other are in-phase signals. In a case where the in-phase radio waves are radiated from the two radiating elements connected to the hybrid coupler on the same substrate, the combined directivity is stronger in the front direction than the directivity of the radio waves radiated from one radiating element. In a case where a beam direction is changed by adjusting the phase shifter of the RFIC in this state, a phase difference between the two radiating elements does not occur, so that the radio waves are less likely to be radiated in a low elevation angle direction and the peak gain can be ensured, but the radiation range may be partially limited.

Therefore, in Embodiment 6, a configuration for expanding the radiation range by individually changing the phases of the radio waves radiated from the radiating elements added by the divider and the hybrid coupler will be described.

Figure 17:
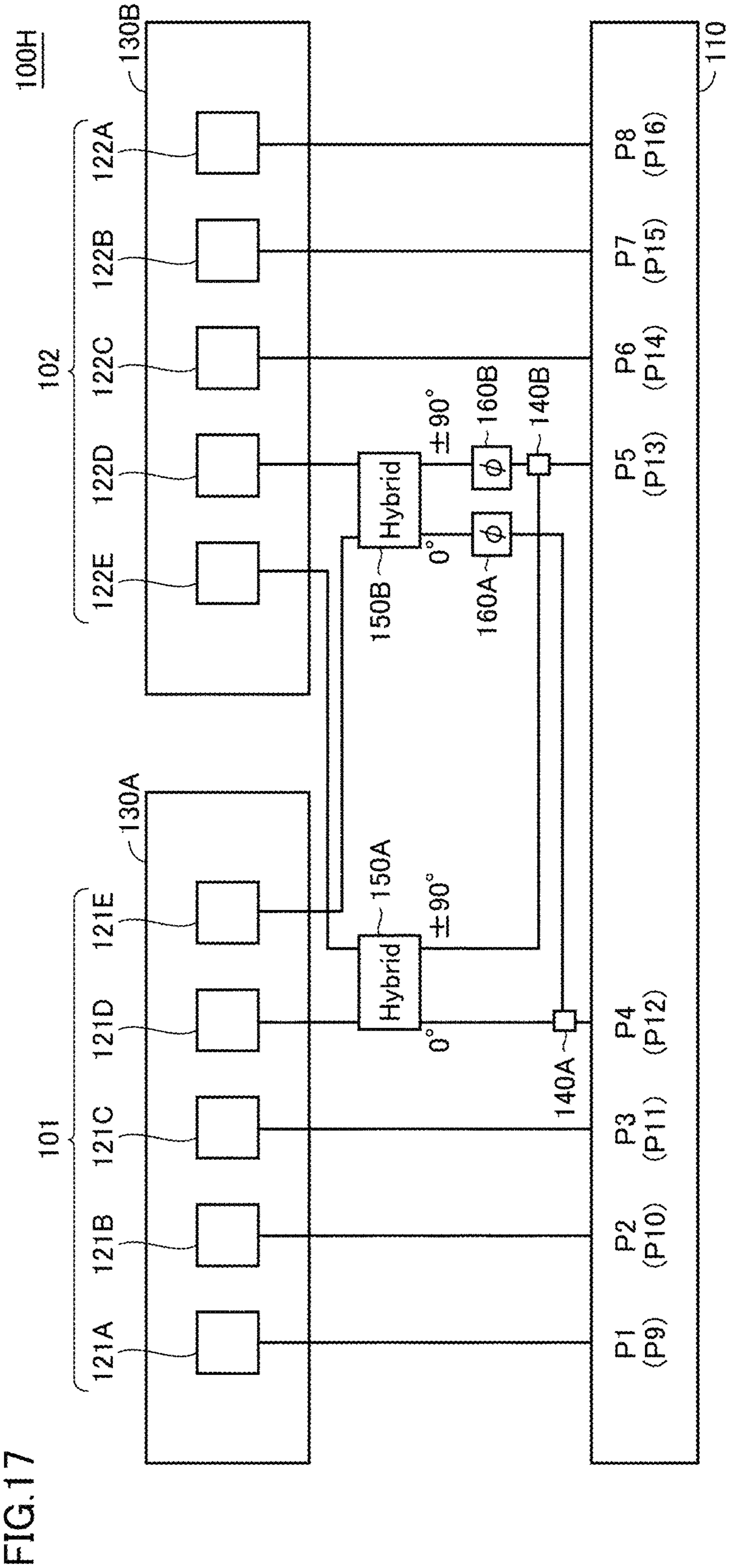
FIG. 17 is a diagram showing the connection state of an antenna module according to Embodiment 6.

FIG. 17 is a diagram showing the connection state of an antenna module 100H according to Embodiment 6. The antenna module 100H has a configuration in which phase shifters 160A and 160B are connected to the two input terminals of the hybrid coupler 150B in the antenna module 100 of Embodiment 1 shown in FIG. 4. In the antenna module 100H, other configurations are the same as in the antenna module 100, and the description of duplicate elements in FIG. 4 will not be repeated.

Referring to FIG. 17, more specifically, the transmission signal from the output port P4 of the RFIC110 is split in two directions by the divider 140A. One of the split signals is supplied to one input terminal of the hybrid coupler 150A. In addition, the other of the split signals is supplied to one input terminal of the hybrid coupler 150B via the phase shifter 160A.

In addition, the transmission signal from the output port P5 of the RFIC110 is split in two directions by the divider 140B. One of the split signals is supplied to the other input terminal of the hybrid coupler 150A. In addition, the other of the split signals is supplied to the other input terminal of the hybrid coupler 150B via the phase shifter 160B.

The phase shifters 160A and 160B are configured to change the phase of the input signal and output the resulting signal. For example, the phase shifters 160A and 160B shift the phase of the input signal by 120° and output the resulting signal. As a result, a phase difference can be provided between the radio waves radiated from the radiating element 121D and the radio waves radiated from the radiating element 121E in the substrate 130A and between the radio waves radiated from the radiating element 122D and the radio waves radiated from the radiating element 122E in the substrate 130B, so that the peak gain is slightly reduced, but the radio waves can be easily radiated in the low elevation angle direction, and, as a result, the radiation range can be expanded.

Figure 18:
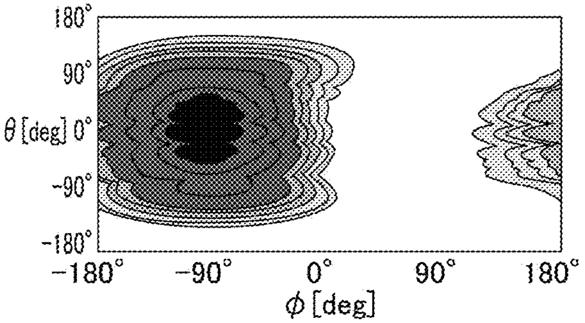
FIG. 18 is a diagram for explaining the gain distribution in the radiating elements on the low frequency (28 GHZ) side.
Figure 18:
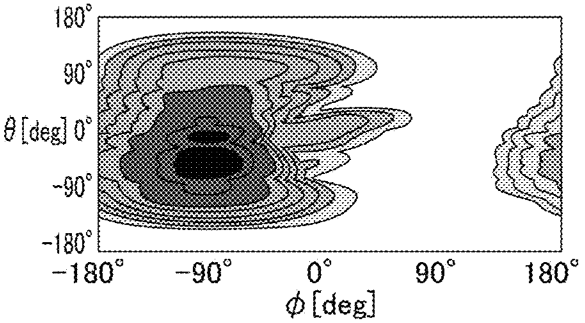
Figure 19:
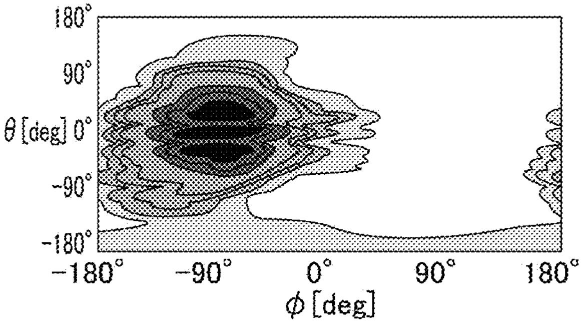
FIG. 19 is a diagram for explaining gain distribution in radiating elements on a high frequency (39 GHz) side.
Figure 19:
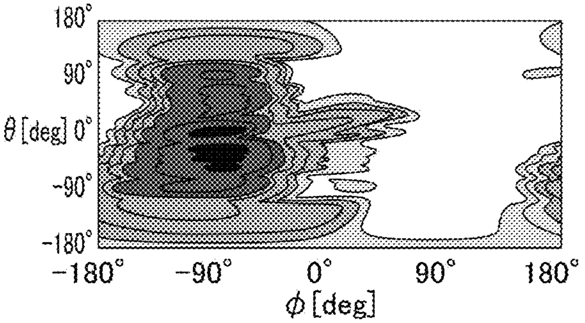

Next, the simulation results of the antenna characteristics of the antenna module 100H of Embodiment 6 will be described with reference to FIGS. 18 and 19. FIG. 18 is a diagram showing the simulation results of the gain distribution (upper row) and the CDF (lower row) in the case of the dual-band and dual-polarization type antenna module as shown in FIG. 6 in the low frequency (28 GHZ) band. In addition, FIG. 19 is a diagram showing the simulation results of the gain distribution (upper row) and the CDF (lower row) in a high frequency (39 GHz) band. In FIGS. 18 and 19, the left column shows a case in which the in-phase radio waves are radiated from the two corresponding radiating elements as in Embodiment 1, and the right column shows a case in which a phase difference of the radio waves radiated from the two corresponding radiating elements is 120° as in Embodiment 6. Both FIGS. 18 and 19 show examples of the gain distribution in a case where radio waves in two polarization directions are simultaneously radiated from the substrate 130A.

Referring to FIG. 18, in a case where the phase difference is set to 120° as in Embodiment 6, the peak gain is 9.97 dBi by being slightly decreased from 10.25 dBi in Embodiment 1. However, the gain particularly in the vicinity of $\varphi=0°$ is increased, and the gain at CDF=50% is increased from 1.62 dBi to 2.34 dBi, thereby expanding the radiation range. In addition, in the 39 GHz band of FIG. 19, the peak gain is also slightly decreased from 11.57 dBi to 10.76 dBi, but the gain at CDF=50% is further increased from 0.77 dBi and is expanded to 1.75 dBi.

As described above, in a configuration in which the output port assigned to the radiating element of the other antenna group is used by using the divider and the hybrid coupler, it is possible to expand the radiation range by providing the phase difference between the signals output from the two hybrid couplers.

In the antenna module 100H, an example has been described in which the phase difference between the radio waves from the two hybrid couplers is set to 120°, but the phase difference is appropriately selected according to the specifications of the required peak gain and the radiation range.

The "phase shifter 160A" and the "phase shifter 160B" in Embodiment 6 correspond to a "first phase shifter" and a "second phase shifter" in the present disclosure, respectively.

Modification Example 4

In the antenna module 100H of Embodiment 6, the configuration is described in which the phase shifter is disposed at the two input terminals of one hybrid coupler. In Modification Example 4, a configuration in which the phase shifter is disposed on the output terminal side of the hybrid coupler will be described.

Figure 20:
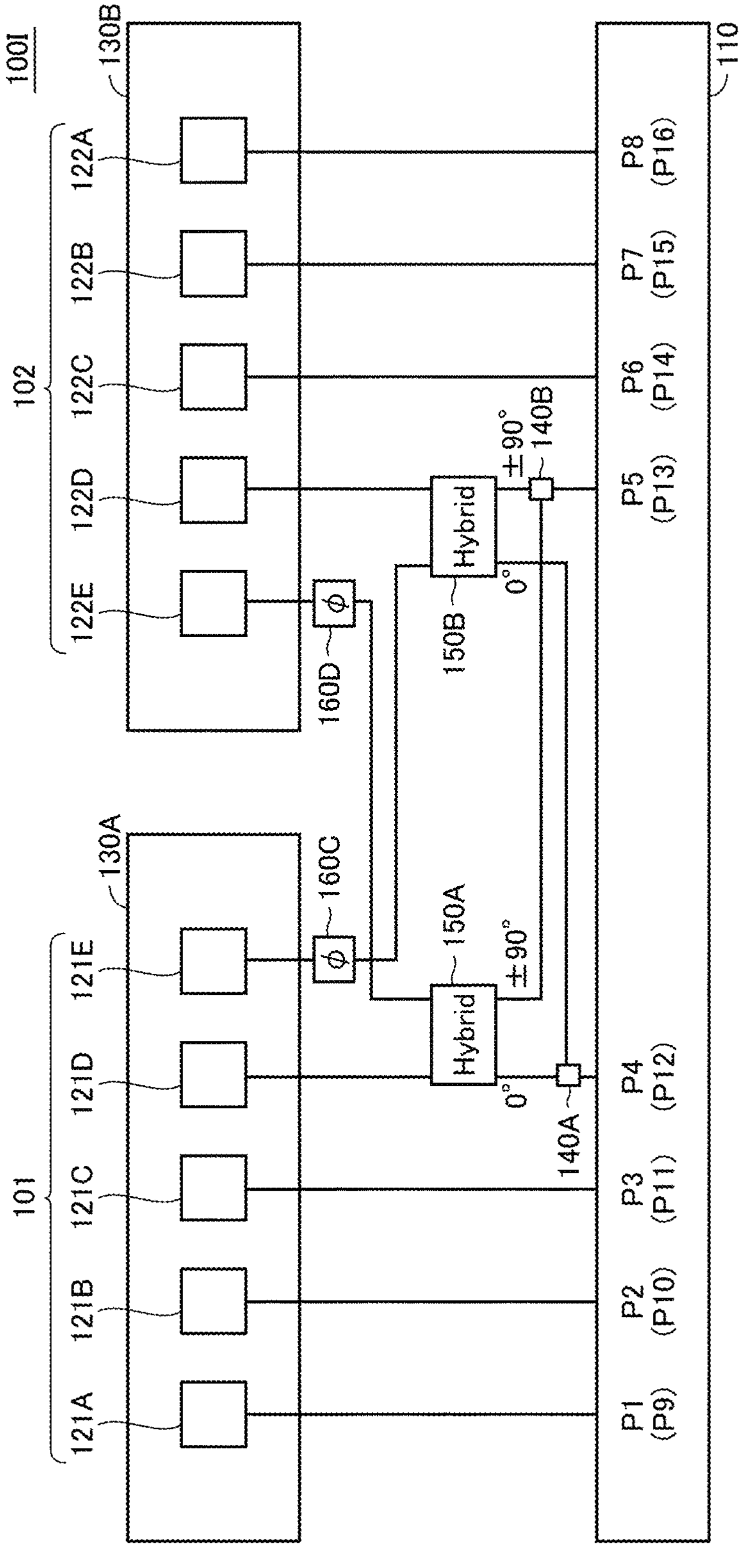
FIG. 20 is a diagram showing the connection state of an antenna module of Modification Example 4.

FIG. 20 is a diagram showing the connection state of an antenna module 100I of Modification Example 4. The antenna module 100I has a configuration in which each of the phase shifters 160D and 160C is disposed at one output terminal of each of the hybrid couplers 150A and 150B of the antenna module 100 of Embodiment 1 shown in FIG. 4. In the antenna module 100I, other configurations are the same as those of the antenna module 100, and the description of duplicate elements in FIG. 4 will not be repeated.

Referring to FIG. 20, one output terminal (first output terminal) of the hybrid coupler 150A is connected to the radiating element 121D of the first antenna group 101. The other output terminal (second output terminal) of the hybrid coupler 150A is connected to the radiating element 122E of the second antenna group 102 via the phase shifter 160D. The phase shifter 160D changes the signal from the hybrid coupler 150A by 120°.

In addition, one output terminal (first output terminal) of the hybrid coupler 150B is connected to the radiating element 121E of the first antenna group 101 via the phase shifter 160C. The other output terminal (second output terminal) of the hybrid coupler 150B is connected to the radiating element 122D of the second antenna group 102. The phase shifter 160C changes the signal from the hybrid coupler 150B by 120°.

Even with such a configuration, a phase difference can be provided between the radio wave radiated from the radiating element 121D and the radio wave radiated from the radiating element 121E in the substrate 130A and between the radio wave radiated from the radiating element 122D and the radio wave radiated from the radiating element 122E in the substrate 130B. Accordingly, although the peak gain is slightly reduced, the radio wave is more easily radiated in the low elevation angle direction, and, as a result, the radiation range can be expanded.

The "phase shifter 160C" and the "phase shifter 160D" in Modification Example 4 correspond to a "third phase shifter" and a "fourth phase shifter" in the present disclosure, respectively.

Modification Example 5

In the antenna module of Embodiment 6 and Modification Example 4, the configuration is described in which the phase shifter is added to the configuration in which the divider is disposed on the input side of the hybrid coupler. In Modification Example 5, a configuration will be described in which the phase shifter is disposed on one of the radiating elements connected to the divider in a configuration in which the divider is disposed on the output side of the hybrid coupler as shown in Reference Example in FIG. 7.

Figure 21:
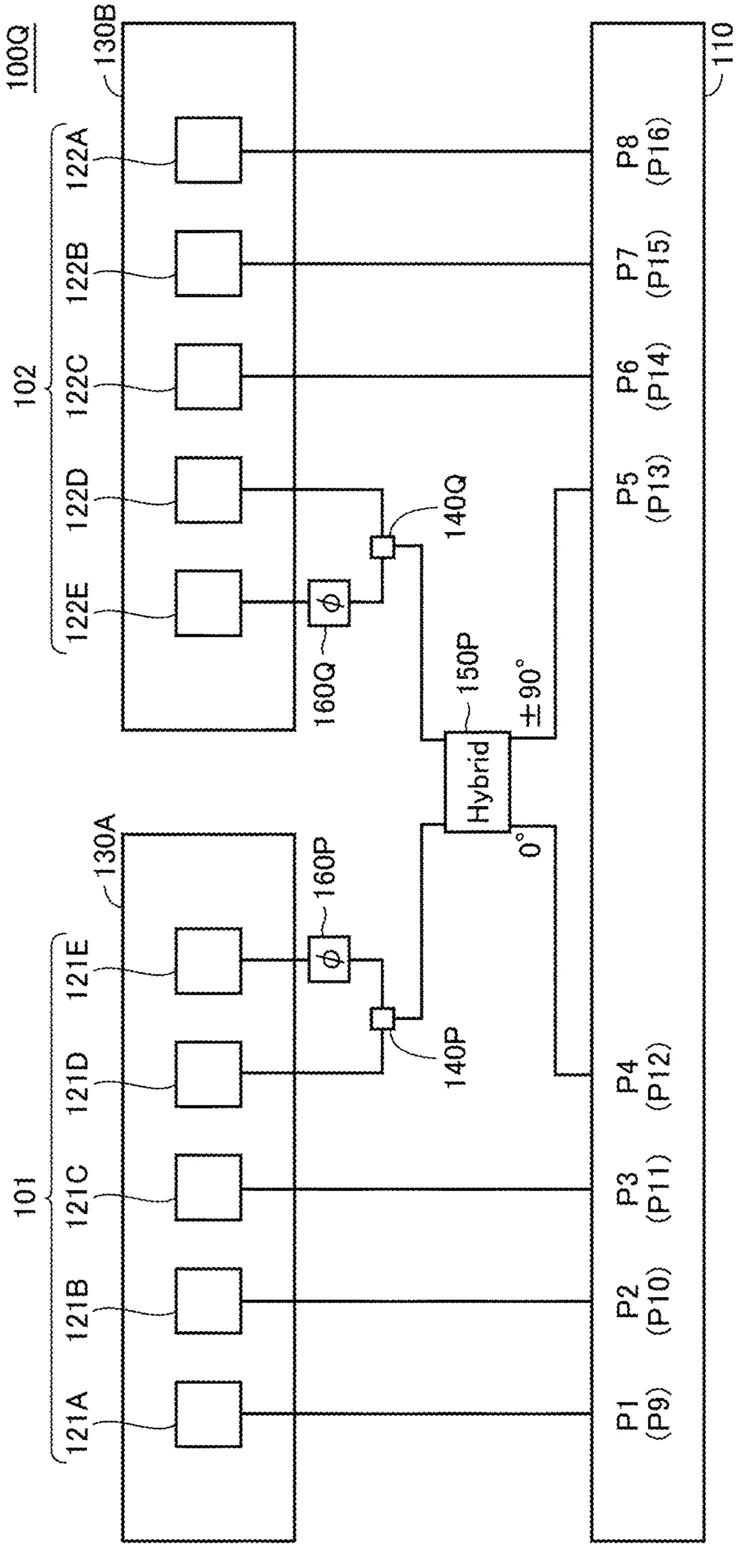
FIG. 21 is a diagram showing the connection state of an antenna module of Modification Example 5.

FIG. 21 is a diagram showing the connection state of an antenna module 1000 of Modification Example 5. The antenna module 100Q has a configuration in which phase shifters 160P and 1600 are added to the antenna module 100P described in Reference Example of FIG. 7. Specifically, one output of the divider 140P is connected to the radiating element 121D of the first antenna group 101, and the other output is connected to the radiating element 121E of the first antenna group 101 via the phase shifter 160P. The phase shifter 160P changes the signal from the divider 140P by 120°.

Similarly, one output of the divider 1400 is connected to the radiating element 122D of the second antenna group 102, and the other output is connected to the radiating element 122E of the second antenna group 102 via the phase shifter 160Q. The phase shifter 1600 changes the signal from the divider 1400 by 120°.

Even with such a configuration, a phase difference can be provided between the radio wave radiated from the radiating element 121D and the radio wave radiated from the radiating element 121E in the substrate 130A and between the radio wave radiated from the radiating element 122D and the radio wave radiated from the radiating element 122E in the substrate 130B. Therefore, although the peak gain is slightly reduced, the radio wave is more easily radiated in the low elevation angle direction, and, as a result, the radiation range can be expanded.

Embodiment 7

In Embodiment 7, a configuration is described in which two substrates on which the radiating elements are disposed are isolated from each other and are connected to each other by a flexible cable.

Figure 22:
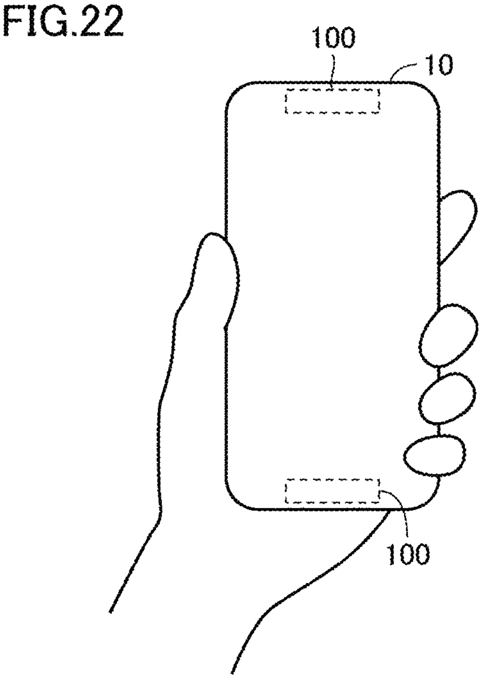
FIG. 22 is a diagram showing the disposition of the antenna module in a smartphone.

In a case where the antenna module having a cross section with a substantially L-shape as shown in FIG. 2, FIG. 5, and the like is disposed in a smartphone which is the communication device 10, the electrodes for a touch panel are disposed in a lattice shape on a display surface of the smartphone. Therefore, in general, the substrate 130A is disposed on a main surface (that is, a back surface) side opposite to the display surface, and the substrate 130B is disposed on a side surface of the smartphone. In addition, in a case of making a telephone call with the smartphone and in a case of browsing a Web page, usually, the smartphone is held such that the main body having a substantially rectangular shape is oriented vertically, in other words, such that the short edge is oriented in the horizontal direction, as shown in FIG. 22. In this case, the antenna module is disposed at an end portion along the short edge of the main body so that the antenna module is not shielded by a hand and/or a finger that holds the main body. As a result, the antenna module radiates the radio waves from the side surface of the short edge of the main body in the direction along the long edge and radiates the radio waves in the back surface direction of the main body.

Figure 23:
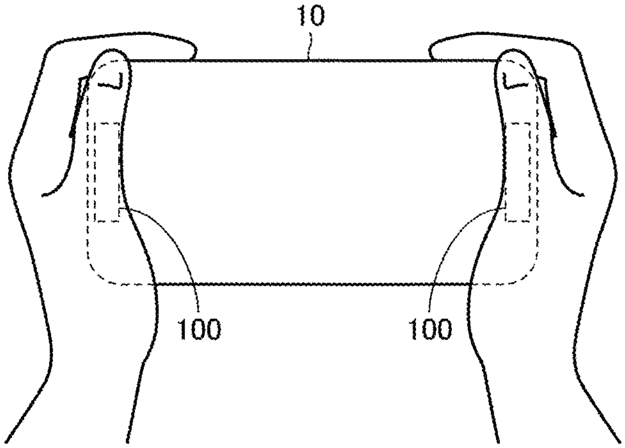
FIG. 23 is a diagram for explaining the positional relationship between the antenna module and a hand when a method of holding the smartphone is changed.

However, in the case of watching a video, such as a movie, and/or in the case of playing a game, as shown in FIG. 23, there is a case in which the smartphone is held horizontally such that the long edge of the main body of the communication device 10 becomes a horizontal direction. In such a case, there is a possibility that both end portions on the short edge side of the main body are held, and, as a result, a state in which the entire antenna module in the main body is covered by the hand may be obtained. In this case, there is a risk that the transmission and reception of radio waves by the antenna module are not being correctly performed.

Therefore, Embodiment 7 has a configuration in which the two substrates 130A and 130B constituting the dielectric substrate 105 are isolated, and the isolated substrates are connected via a flexible substrate. With such a configuration, the degree of freedom in the disposition of each substrate can be increased, and thus the radiating elements can be disposed on positions where radio waves can be transmitted and received, regardless of user's smartphone holding mode.

Figure 24:
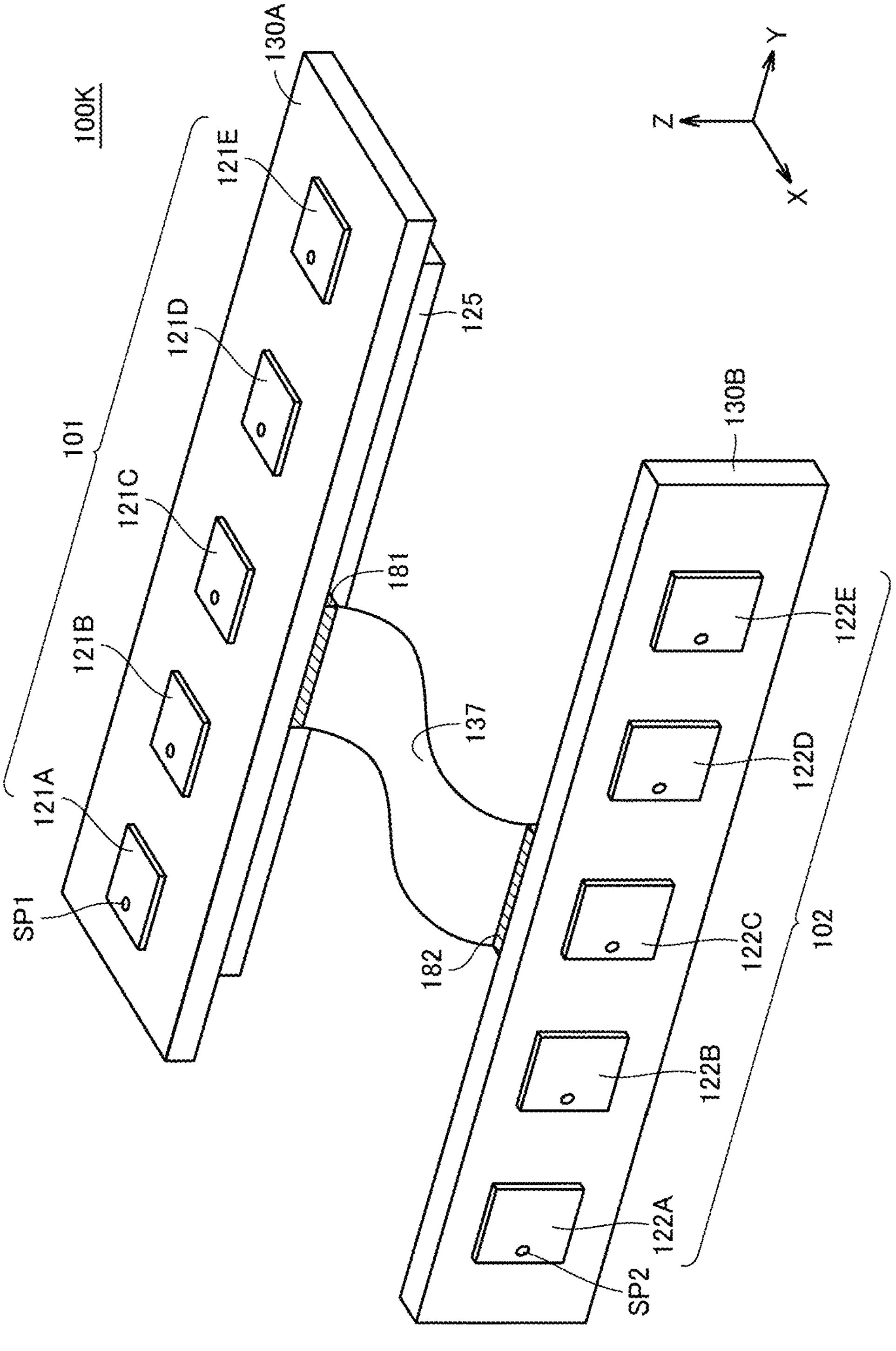
FIG. 24 is a perspective view of an antenna module according to Embodiment 7.

FIG. 24 is a perspective view of an antenna module 100K according to Embodiment 7. Referring to FIG. 24, the antenna module 100K has a configuration in which the bent portion 135 in FIG. 2 is removed and the substrate 130A and the substrate 130B are isolated from each other. The flexible substrate 137 with flexibility connects the substrate 130A and the substrate 130B. One end of the flexible substrate 137 is connected to a connector 181 disposed on the back surface side of the substrate 130A. In addition, the other end of the flexible substrate 137 is connected to a connector 182 disposed on the back surface side of the substrate 130B. In the antenna module 100K, each of the connector 181 of the substrate 130A and the connector 182 of the substrate 130B is disposed in the vicinity of the center of each substrate in the long edge direction.

Figure 25:
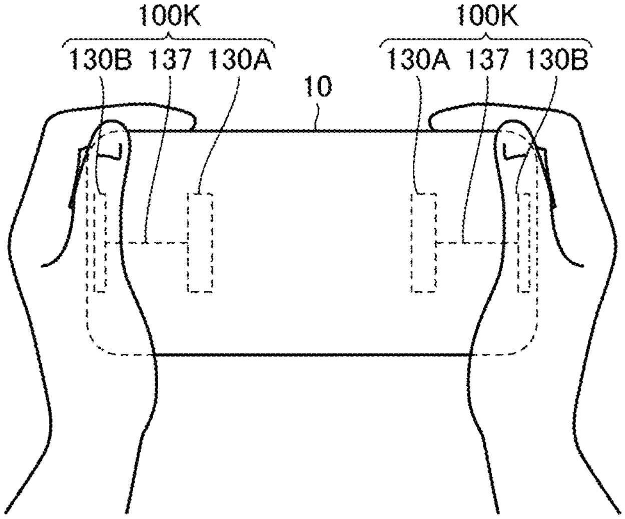
FIG. 25 is a diagram showing a disposition example of an antenna module of Embodiment 7 in the communication device.

With such a configuration, for example, as shown in FIG. 25, the substrate 130B can be disposed on a side surface of a short edge of the main body of the communication device 10 (smartphone), and the substrate 130A can be disposed at a position which is closer to the center than the short edge on the back surface side of the main body of the communication device 10 and at a position which is not covered by the hand. Therefore, in any of the cases where the smartphone is held vertically as shown in FIG. 22 or held horizontally as shown in FIG. 23, it is possible to appropriately transmit and receive the radio waves.

With regard to the connection between the substrate 130A, the substrate 130B, and the flexible substrate 137, the connection using solder may be made instead of the connection using the connectors 181 and 182 as shown in FIG. 24. In addition, a protruding portion may be provided on at least one of the substrate 130A and the substrate 130B without using the flexible substrate, and the substrate 130A and the substrate 130B may be directly connected to each other via the protruding portion by using a connecting member such as a connector or solder. In this case, the protruding portion provided on the substrate 130A and/or the substrate 130B may have a thickness which is thinner than the other substrate portions.

In the above description, the example has been described in which the antenna module is disposed in the smartphone, but the configuration can also be applied to other mobile terminal devices, such as a tablet, an electronic organizer, and/or a game console which have a communication function.

Modification Example 6

In Modification Example 6, an example is described in which the connection position of the flexible substrate on the substrate is different.

Figure 26:
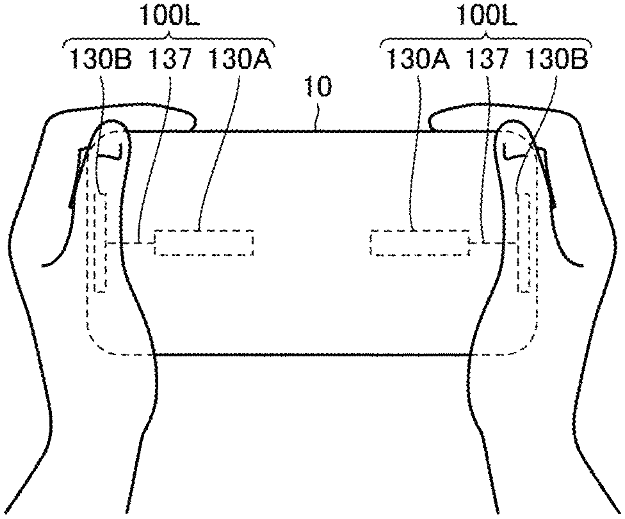
FIG. 26 is a diagram showing a disposition example of an antenna module of Modification Example 6 in the communication device.

FIG. 26 is a diagram showing a disposition example of an antenna module 100L of Modification Example 6 in the communication device 10. In the antenna module 100L, the flexible substrate 137 is connected to the vicinity of the center of the substrate 130B in the long edge direction, and is connected to the substrate 130A in the short edge direction. By connecting the flexible substrate 137 to the substrate 130A in the short edge direction, as shown in FIG. 26, a part of the radiating element 121 disposed on the substrate 130A can be positioned closer to the center side of the main body of the smartphone. Therefore, it is possible to further suppress the radiating elements from being covered by the user's hand and/or finger.

Modification Example 7

In Modification Example 7, a configuration will be described in which a substrate on which the radiating elements are disposed is divided, and some of the radiating elements included in each antenna group are disposed at a different position in the communication device.

Figure 27:
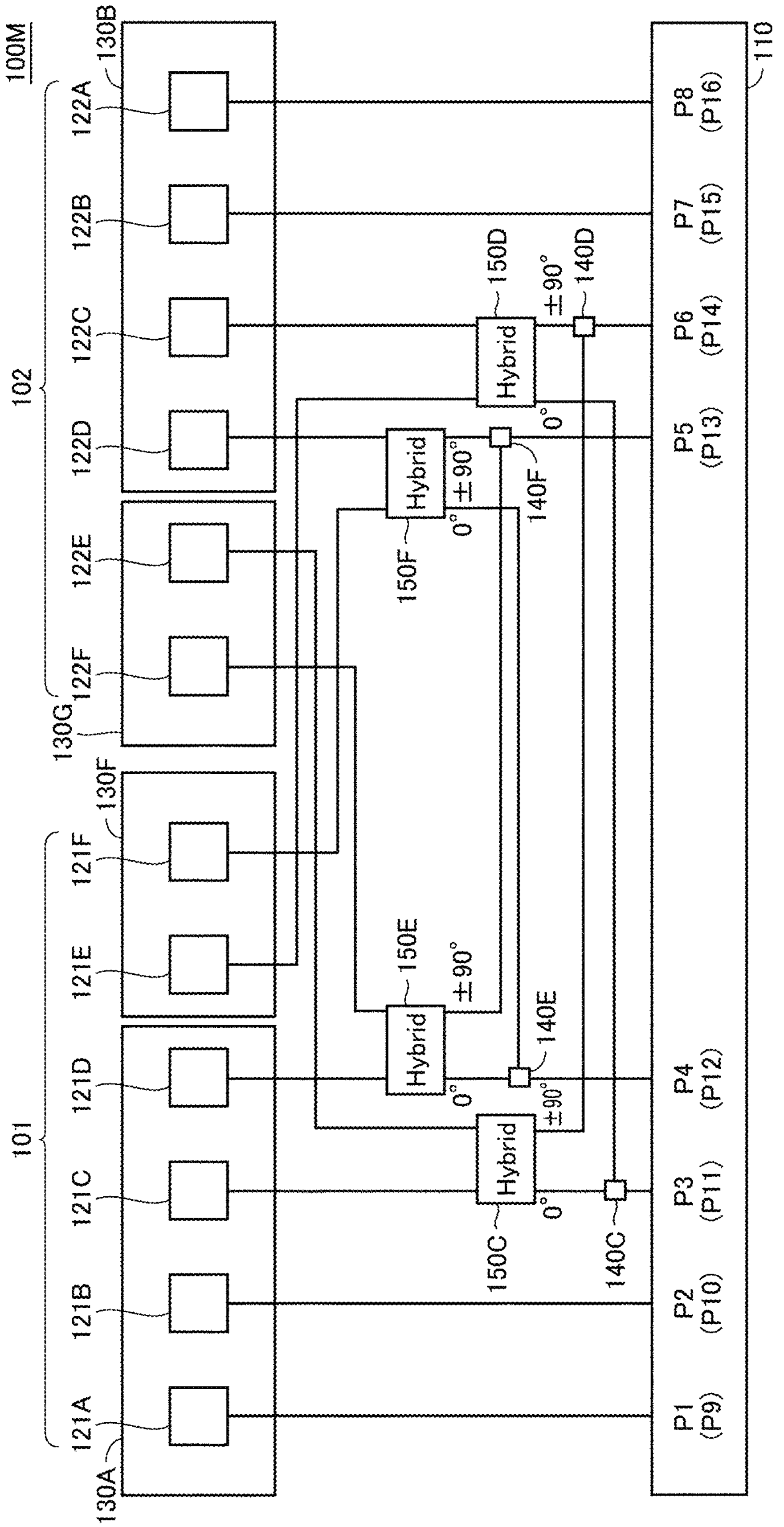
FIG. 27 is a diagram showing the connection state of an antenna module of Modification Example 7.

FIG. 27 is a diagram showing the connection state of an antenna module 100M of Modification Example 7. The antenna module 100M has a configuration in which the radiating elements 121E and 121F of the antenna module 100B of Embodiment 2 shown in FIG. 10 are disposed on a substrate 130F which is different from the substrate 130A and the radiating elements 122E and 122F are disposed on a substrate 130G which is different from the substrate 130B. That is, the radiating elements 121A to 121D are disposed on the substrate 130A, and the radiating elements 122A to 122D are disposed on the substrate 130B.

As described above, in order to suppress the transmission loss, the divider 140 and the hybrid coupler 150 are disposed on the substrate 130A on which the SiP module 125 is disposed, and each of the substrates 130F and 130G is connected to the substrate 130A by the flexible substrate 137.

Figure 28:
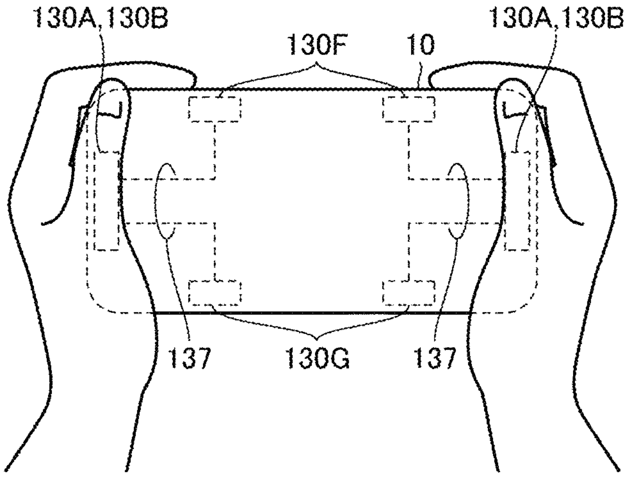
FIG. 28 is a diagram showing a disposition example of an antenna module of Modification Example 7 in the communication device.

FIG. 28 is a diagram showing a disposition example of an antenna module 100M of Modification Example 7 in the communication device 10. The dielectric substrate 105 (that is, the substrates 130A and 130B) having a substantially L-shaped cross section is disposed along a short edge of the main body of the communication device 10. The substrate 130B is disposed on the side surface of the short edge of the main body, and the substrate 130A is disposed at an end portion along the short edge of the main surface on the back surface side of the main body. In a position closer to the center than the short edge of the main surface of the main body of the communication device 10 on the back surface side, the substrate 130F is disposed along one long edge and the substrate 130G is disposed along the other long edge.

In this way, by disposing some radiating elements of each antenna group on the separate substrate and disposing the separate substrate at a position not covered by the user's hand using the flexible substrate, it is possible to appropriately transmit and receive the radio waves regardless of the holding mode of the communication device.

[Aspects]

(Term 1) An antenna module according to an aspect includes a first antenna group and a second antenna group, a first hybrid coupler and a second hybrid coupler, a first divider and a second divider, and a power feeding circuit. The first antenna group includes a first radiating element and a second radiating element. The second antenna group includes a third radiating element and a fourth radiating element. Each of the hybrid coupler has a first input terminal, a second input terminal, a first output terminal, and a second output terminal. The power feeding circuit supplies a high frequency signal to each of the radiating elements. Each divider splits the high frequency signal from the power feeding circuit in two directions. Each antenna group is capable of radiating a radio wave in a first frequency band. The first divider splits a first signal from the power feeding circuit to the first input terminal of each hybrid coupler. The second divider splits a second signal from the power feeding circuit to the second input terminal of each hybrid coupler. The first output terminal and the second output terminal of the first hybrid coupler are connected to the first radiating element and the third radiating element, respectively. The first output terminal and the second output terminal of the second hybrid coupler are connected to the second radiating element and the fourth radiating element, respectively. In each hybrid coupler, a phase difference between the high frequency signals supplied to the first input terminal and the second input terminal is set to 90°.

(Term 2) The antenna module according to term 1 further includes a first substrate and a second substrate having different normal directions from each other. The first antenna group is disposed on the first substrate. The second antenna group is disposed on the second substrate.

(Term 3) The antenna module according to term 2 further includes a first phase shifter and a second phase shifter. The first phase shifter is connected to the first input terminal of the second hybrid coupler and changes a phase of the first signal from the power feeding circuit. The second phase shifter is connected to the second input terminal of the second hybrid coupler and changes a phase of the second signal from the power feeding circuit.

(Term 4) In the antenna module according to term 3, the first phase shifter changes the phase of the first signal by 120°. The second phase shifter changes the phase of the second signal by 120°.

(Term 5) The antenna module according to term 2 further includes a third phase shifter and a fourth phase shifter. The third phase shifter is connected to the first output terminal of the second hybrid coupler and changes a phase of a signal to be output to the second radiating element. The fourth phase shifter is connected to the second output terminal of the first hybrid coupler and changes a phase of a signal to be output to the third radiating element.

(Term 6) In the antenna module according to term 5, the third phase shifter changes the phase of the signal to be output to the second radiating element by 120°. The fourth phase shifter changes the phase of the signal to be output to the third radiating element by 120°.

(Term 7) The antenna module according to term 1 further includes a first substrate and a second substrate having different normal directions from each other. The first radiating element and the third radiating element are disposed on the first substrate. The second radiating element and the fourth radiating element are disposed on the second substrate.

(Term 8) The antenna module according to any one of terms 1 to 7 further includes a third hybrid coupler and a fourth hybrid coupler, and a third divider and a fourth divider. The first antenna group further includes a fifth radiating element and a sixth radiating element. The second antenna group further includes a seventh radiating element and an eighth radiating element. The third divider splits the third signal from the power feeding circuit to a first input terminal of the third hybrid coupler and a first input terminal of the fourth hybrid coupler. The fourth divider splits the fourth signal from the power feeding circuit to a second input terminal of the third hybrid coupler and a second input terminal of the fourth hybrid coupler. A first output terminal and a second output terminal of the third hybrid coupler are connected to the fifth radiating element and the seventh radiating element, respectively. A first output terminal and a second output terminal of the fourth hybrid coupler are connected to the sixth radiating element and the eighth radiating element, respectively. In each of the third hybrid coupler and the fourth hybrid coupler, a phase difference between the high frequency signals supplied to the first input terminal and the second input terminal is set to 90°.

(Term 9) In the antenna module according to term 2, a plurality of radiating elements included in the first antenna group are one-dimensionally arranged on the first substrate. A plurality of radiating elements included in the second antenna group are one-dimensionally arranged on the second substrate.

(Term 10) In the antenna module according to term 2, a plurality of radiating elements included in the first antenna group are two-dimensionally arranged on the first substrate. A plurality of radiating elements included in the second antenna group are two-dimensionally arranged on the second substrate.

(Term 11) An antenna module according to another aspect includes a plurality of radiating elements including a first radiating element and a second radiating element, a first hybrid coupler and a second hybrid coupler, a first divider and a second divider, and a power feeding circuit. Each radiating element is capable of radiating radio waves having a first direction as a polarization direction and radio waves having a second direction as a polarization direction. Each of the hybrid coupler has a first input terminal, a second input terminal, a first output terminal, and a second output terminal. The power feeding circuit supplies a high frequency signal to the plurality of radiating elements. Each divider splits the high frequency signal from the power feeding circuit in two directions. The first divider splits a first signal from the power feeding circuit to the first input terminal of each hybrid coupler. The second divider splits a second signal from the power feeding circuit to the second input terminal of each hybrid coupler. The first output terminal of the first hybrid coupler is connected to a power supply point for polarization of the first radiating element in the first direction. The second output terminal of the first hybrid coupler is connected to a power supply point for the polarization of the second radiating element in the second direction. The first output terminal of the second hybrid coupler is connected to a power supply point for the polarization of the second radiating element in the first direction. The second output terminal of the second hybrid coupler is connected to a power supply point for the polarization of the first radiating element in the second direction. In each of the hybrid couplers, a phase difference between the high frequency signals supplied to the first input terminal and the second input terminal is set to 90°.

(Term 12) In the antenna module according to term 11, the first direction and the second direction are orthogonal to each other.

(Term 13) The antenna module according to term 11 or 12 further includes a first phase shifter and a second phase shifter. The first phase shifter is connected to the first input terminal of the second hybrid coupler and changes a phase of the first signal from the power feeding circuit. The second phase shifter is connected to the second input terminal of the second hybrid coupler and changes a phase of the second signal from the power feeding circuit.

(Term 14) A communication device includes the antenna module according to any one of terms 1 to 13.

The embodiment disclosed herein is required to be considered to be an example and not restrictive in all respects. The scope of the present invention is indicated by the claims rather than the description of the above-described embodiment, and is intended to include all changes within the meaning and range of equivalents to the claims.

REFERENCE SIGNS LIST

10 COMMUNICATION DEVICE
100, 100A to 100I, 100K to 100M, 100P, 100Q, 100X ANTENNA MODULE
101, 102 ANTENNA GROUP
105, 105E, 105F, 130 DIELECTRIC SUBSTRATE
110 RFIC
111A to 111H, 113A to 113H, 117A, 117B SWITCH
112AR to 112HR LOW NOISE AMPLIFIER
112AT to 112HT POWER AMPLIFIER
114A to 114H ATTENUATOR
115A to 115H, 160A to 160D, 160P, 160Q PHASE SHIFTER
116A, 116B SIGNAL COMBINER/DIVIDER
118A, 118B MIXER
119A, 119B AMPLIFIER CIRCUIT
120, 120G ANTENNA DEVICE
121, 121A to 121F, 121H, 122, 122A to 122F, 122H, 123, 123A to 123E, 124, 124A to 124E, 126 RADIATING ELEMENT
125 SiP MODULE
130A to 130G SUBSTRATE
133 PROTRUDING PORTION
134 BOUNDARY PORTION
135 BENT PORTION
136 NOTCHED PORTION
137 FLEXIBLE SUBSTRATE
140, 140A to 140H, 140P, 140Q DIVIDER
150, 150A to 150H, 150P HYBRID COUPLER
151 FIRST LINE
152 SECOND LINE
171, 172 POWER SUPPLY WIRING
200 BBIC
IN1, IN2 INPUT TERMINAL
OUT1, OUT2 OUTPUT TERMINAL
P1 to P16 OUTPUT PORT
RG1, RG2 REGION
SP1, SP1A, SP1B, SP1H, SP1V, SP2, SP2A, SP2B POWER SUPPLY POINT

The invention claimed is:

1. An antenna module comprising:

a first antenna group including a first radiating element and a second radiating element;

a second antenna group including a third radiating element and a fourth radiating element;

a first hybrid coupler and a second hybrid coupler each having a first input terminal, a second input terminal, a first output terminal, and a second output terminal;

a power feeding circuit having a first port and a second port;

a first divider configured to split a first signal from the first port of the power feeding circuit to the first input terminal of each of the first hybrid coupler and the second hybrid coupler; and a second divider configured to split a second signal from the power feeding circuit to the second input terminal of each of the first hybrid coupler and the second hybrid coupler, the second signal being substantially 90 degrees out of phase with the first signal; wherein the first output terminal and the second output terminal of the first hybrid coupler are connected to the first radiating element and the third radiating element, respectively, the first output terminal and the second output terminal of the second hybrid coupler are connected to the second radiating element and the fourth radiating element, respectively, and a total number of antennas in the first antenna group and the second antenna group being greater than a total number of ports of the power feeding circuit that provide signals to drive the total number of antennas.

2. The antenna module according to claim 1, further comprising:

a first substrate and a second substrate having different normal directions from each other, wherein the first antenna group is disposed on the first substrate, and the second antenna group is disposed on the second substrate.

3. The antenna module according to claim 2, further comprising:

a first phase shifter that is connected to the first input terminal of the second hybrid coupler and is configured to change a phase of the first signal from the power feeding circuit; and a second phase shifter that is connected to the second input terminal of the second hybrid coupler and is configured to change a phase of the second signal from the power feeding circuit.

4. The antenna module according to claim 3, wherein the first phase shifter is configured to change the phase of the first signal by 120°, and the second phase shifter is configured to change the phase of the second signal by 120°.

5. The antenna module according to claim 2, further comprising:

a third phase shifter that is connected to the first output terminal of the second hybrid coupler and is configured to change a phase of a signal to be output to the second radiating element; and a fourth phase shifter that is connected to the second output terminal of the first hybrid coupler and is configured to change a phase of a signal to be output to the third radiating element.

6. The antenna module according to claim 5, wherein the third phase shifter is configured to change the phase of the signal to be output to the second radiating element by 120°, and the fourth phase shifter is configured to change the phase of the signal to be output to the third radiating element by 120°.

7. The antenna module according to claim 2, further comprising:

a third hybrid coupler and a fourth hybrid coupler; and a third divider and a fourth divider, wherein the first antenna group further includes a fifth radiating element and a sixth radiating element, the second antenna group further includes a seventh radiating element and an eighth radiating element, the third divider is configured to split a third signal from the power feeding circuit to a first input terminal of each of the third hybrid coupler and the fourth hybrid coupler, the fourth divider is configured to split a fourth signal from the power feeding circuit to a second input terminal of each of the third hybrid coupler and the fourth hybrid coupler, a first output terminal and a second output terminal of the third hybrid coupler are connected to the fifth radiating element and the seventh radiating element, respectively, a first output terminal and a second output terminal of the fourth hybrid coupler are connected to the sixth radiating element and the eighth radiating element, respectively, and in each of the third hybrid coupler and the fourth hybrid coupler, a phase difference between radio frequency signals supplied to the first input terminal and the second input terminal is set to 90°.

8. The antenna module according to claim 2, wherein the first antenna group includes a fifth radiating element and each of the first radiating element, the second radiating element, and the third radiating element are one-dimensionally arranged on the first substrate, and the second antenna group includes a sixth radiating element and each of the third radiating element, the fourth radiating element, and the sixth radiating element are one-dimensionally arranged on the second substrate.

9. The antenna module according to claim 2, wherein the first antenna group includes a fifth radiating element and a sixth radiating element, and the first radiating element, the second radiating element, and the fifth radiating element, and the sixth radiating element are two-dimensionally arranged on the first substrate, and the second antenna group includes a seventh radiating element and an eighth radiating element, and the third radiating element, the fourth radiating element, the seventh radiating element, and the eighth radiating element are two-dimensionally arranged on the second substrate.

10. The antenna module according to claim 1, further comprising:

a first substrate and a second substrate having different normal directions from each other, wherein the first radiating element and the third radiating element are disposed on the first substrate, and the second radiating element and the fourth radiating element are disposed on the second substrate.

11. The antenna module according to claim 10, further comprising:

a third hybrid coupler and a fourth hybrid coupler; and a third divider and a fourth divider, wherein the first antenna group further includes a fifth radiating element and a sixth radiating element, the second antenna group further includes a seventh radiating element and an eighth radiating element, the third divider is configured to split a third signal from the power feeding circuit to a first input terminal of each of the third hybrid coupler and the fourth hybrid coupler, the fourth divider is configured to split a fourth signal from the power feeding circuit to a second input terminal of each of the third hybrid coupler and the fourth hybrid coupler, a first output terminal and a second output terminal of the third hybrid coupler are connected to the fifth radiating element and the seventh radiating element, respectively, a first output terminal and a second output terminal of the fourth hybrid coupler are connected to the sixth radiating element and the eighth radiating element, respectively, and in each of the third hybrid coupler and the fourth hybrid coupler, a phase difference between radio frequency signals supplied to the first input terminal and the second input terminal is set to 90°.

12. The antenna module according to claim 1, further comprising:

a third hybrid coupler and a fourth hybrid coupler; and a third divider and a fourth divider, wherein the first antenna group further includes a fifth radiating element and a sixth radiating element, the second antenna group further includes a seventh radiating element and an eighth radiating element, the third divider is configured to split a third signal from the power feeding circuit to a first input terminal of each of the third hybrid coupler and the fourth hybrid coupler, the fourth divider is configured to split a fourth signal from the power feeding circuit to a second input terminal of each of the third hybrid coupler and the fourth hybrid coupler, a first output terminal and a second output terminal of the third hybrid coupler are connected to the fifth radiating element and the seventh radiating element, respectively, a first output terminal and a second output terminal of the fourth hybrid coupler are connected to the sixth radiating element and the eighth radiating element, respectively, and in each of the third hybrid coupler and the fourth hybrid coupler, a phase difference between radio frequency signals supplied to the first input terminal and the second input terminal is set to 90°.

13. An antenna module comprising:

a plurality of radiating elements including a first radiating element and a second radiating element and being capable of radiating a radio wave in a first direction as a polarization direction and a radio wave in a second direction as the polarization direction;

a first hybrid coupler and a second hybrid coupler each having a first input terminal, a second input terminal, a first output terminal, and a second output terminal;

a power feeding circuit configured to supply a radio frequency signal to the plurality of radiating elements; and a first divider and a second divider each configured to split the radio frequency signal from the power feeding circuit in two directions, wherein the first divider is configured to split a first signal from the power feeding circuit to the first input terminal of each hybrid coupler, the second divider is configured to split a second signal from the power feeding circuit to the second input terminal of each hybrid coupler, the first output terminal of the first hybrid coupler is connected to a power supply point to establish polarization in the first direction of the first radiating element, the second output terminal of the first hybrid coupler is connected to a power supply point to establish polarization in the second direction of the second radiating element, the first output terminal of the second hybrid coupler is connected to a power supply point to establish polarization in the first direction of the second radiating element, the second output terminal of the second hybrid coupler is connected to a power supply point to establish polarization in the second direction of the first radiating element, and in each of the first hybrid coupler and the second hybrid coupler, a phase difference between radio frequency signals supplied to the first input terminal and the second input terminal is set to 90°.

14. The antenna module according to claim 13, wherein the first direction and the second direction are orthogonal to each other.

15. The antenna module according to claim 13, further comprising:

a first phase shifter that is connected to the first input terminal of the second hybrid coupler and configured to change a phase of the first signal from the power feeding circuit; and a second phase shifter that is connected to the second input terminal of the second hybrid coupler and configured to change a phase of the second signal from the power feeding circuit.

16. The antenna module according to claim 14, further comprising:

a first phase shifter that is connected to the first input terminal of the second hybrid coupler and configured to change a phase of the first signal from the power feeding circuit; and a second phase shifter that is connected to the second input terminal of the second hybrid coupler and configured to change a phase of the second signal from the power feeding circuit.

17. A communication device comprising:

a transceiver configured to send and receive RF signals via an antenna module; and the antenna module, the antenna module including a first antenna group including a first radiating element and a second radiating element, a second antenna group including a third radiating element and a fourth radiating element, a first hybrid coupler and a second hybrid coupler each having a first input terminal, a second input terminal, a first output terminal, and a second output terminal, a power feeding circuit having a first port and a second port, a first divider configured to split a first signal from the first port of the power feeding circuit to the first input terminal of each of the first hybrid coupler and the second hybrid coupler, and a second divider configured to split a second signal from the power feeding circuit to the second input terminal of each of the first hybrid coupler and the second hybrid coupler, the second signal being substantially 90 degrees out of phase with the first signal, wherein the first output terminal and the second output terminal of the first hybrid coupler are connected to the first radiating element and the third radiating element, respectively, the first output terminal and the second output terminal of the second hybrid coupler are connected to the second radiating element and the fourth radiating element, respectively, and a total number of antennas in the first antenna group and the second antenna group being greater than a total number of ports of the power feeding circuit that provide signals to drive the total number of antennas.

18. The communication device according to claim 17, wherein the antenna module further comprising:

a first substrate and a second substrate having different normal directions from each other, wherein the first antenna group is disposed on the first substrate, and the second antenna group is disposed on the second substrate.

19. The communication device according to claim 18, wherein the antenna module further comprising:

a first phase shifter that is connected to the first input terminal of the second hybrid coupler and is configured to change a phase of the first signal from the power feeding circuit; and a second phase shifter that is connected to the second input terminal of the second hybrid coupler and is configured to change a phase of the second signal from the power feeding circuit.

20. The communication device according to claim 19, wherein the antenna module further comprising:

the first phase shifter is configured to change the phase of the first signal by 120°, and the second phase shifter is configured to change the phase of the second signal by 120°.

* * * * *